United States Patent
Shaw et al.

(10) Patent No.: US 10,761,279 B2
(45) Date of Patent: Sep. 1, 2020

(54) METHOD OF PRODUCING A DEVICE FOR ADIABATIC COUPLING BETWEEN WAVEGUIDE ARRAYS, CORRESPONDING DEVICE, AND SYSTEM

(71) Applicant: STMicroelectronics S.r.l., Agrate Brianza (IT)

(72) Inventors: Mark Andrew Shaw, Milan (IT); Luca Maggi, Garlate (IT); Antonio Fincato, Novara (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/428,428

(22) Filed: May 31, 2019

(65) Prior Publication Data
US 2019/0369341 A1    Dec. 5, 2019

(30) Foreign Application Priority Data

May 31, 2018    (IT) .......................... 102018000005891

(51) Int. Cl.
*G02B 6/42*    (2006.01)
*G02B 6/122*    (2006.01)
*G02B 6/12*    (2006.01)

(52) U.S. Cl.
CPC ......... *G02B 6/4249* (2013.01); *G02B 6/1223* (2013.01); *G02B 6/4204* (2013.01);
(Continued)

(58) Field of Classification Search
CPC .. G02B 6/4249; G02B 6/1223; G02B 6/4204; G02B 6/305; G02B 6/13; G02B 6/12002; G02B 2006/12061; G02B 2006/12147
See application file for complete search history.

(56) References Cited

U.S. PATENT DOCUMENTS

| 5,271,083 A | 12/1993 | Lebby et al. |
| 6,343,164 B1 | 1/2002 | Robertsson et al. |

(Continued)

FOREIGN PATENT DOCUMENTS

| CN | 103777275 A | 5/2014 |
| CN | 104813204 A | 7/2015 |
| WO | 2017189955 A1 | 11/2017 |

OTHER PUBLICATIONS

Boyer, Nicolas, et al, IEEE, "Sub-Micron Bondline-Shape Control in Automated Assembly of Photonic Devices," 2016 IEEE 66th Electronic Components and Technology Conference, May 31, 2016, 7 pages.

(Continued)

*Primary Examiner* — Andrew Jordan
(74) *Attorney, Agent, or Firm* — Slater Matsil, LLP

(57) ABSTRACT

A method includes providing a semiconductor body comprising a surface with a recessed portion therein. The recessed portion includes a bottom surface. Optical waveguide cores in a first array of optical waveguide cores extend side-by-side at the bottom surface. The method further includes providing a second array of optical waveguide cores over the first array of optical waveguide cores. Optical waveguide cores in the second array of optical waveguide cores extend side-by-side. Each optical waveguide core in the second array of optical waveguide cores is in an adiabatic coupling relationship with a corresponding optical waveguide core in the first array of optical waveguide cores. The method also includes applying an optical waveguide cladding material over the second array of optical waveguide cores.

20 Claims, 13 Drawing Sheets

(52) U.S. Cl.
CPC .............. *G02B 2006/12061* (2013.01); *G02B 2006/12147* (2013.01)

(56) References Cited

U.S. PATENT DOCUMENTS

| | | | |
|---|---|---|---|
| 8,787,712 B2* | 7/2014 | Grondin | B82Y 20/00 |
| | | | 385/30 |
| 9,618,699 B2* | 4/2017 | Tummidi | G02B 6/30 |
| 9,658,400 B2* | 5/2017 | Hofrichter | G02B 6/132 |
| 9,678,273 B2* | 6/2017 | Hofrichter | G02B 6/24 |
| 10,466,433 B2* | 11/2019 | Epitaux | G02B 6/2938 |
| 2013/0322813 A1 | 12/2013 | Grondin et al. | |
| 2014/0112616 A1 | 4/2014 | Numata | |
| 2016/0252678 A1 | 9/2016 | Hu et al. | |
| 2016/0266321 A1* | 9/2016 | Tummidi | G02B 6/30 |
| 2016/0266322 A1 | 9/2016 | Epitaux et al. | |
| 2016/0349452 A1* | 12/2016 | Hofrichter | G02B 6/24 |
| 2017/0052318 A1* | 2/2017 | Hofrichter | G02B 6/132 |
| 2017/0351031 A1 | 12/2017 | Shastri et al. | |
| 2018/0164520 A1* | 6/2018 | Epitaux | G02B 6/3652 |
| 2018/0275342 A1 | 9/2018 | Shaw | |
| 2018/0306991 A1* | 10/2018 | Epitaux | G02B 6/3652 |

OTHER PUBLICATIONS

Wahlbrink, Thorsten et al. "Fabrication of high efficiency SOI taper structures," Microelectronic Engineering, Jan. 29, 2009, 3 pages.

\* cited by examiner

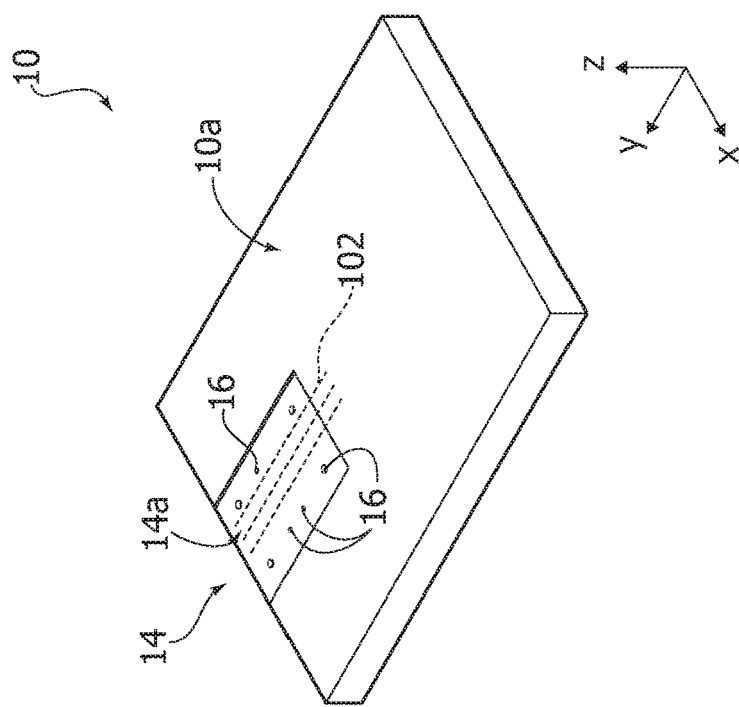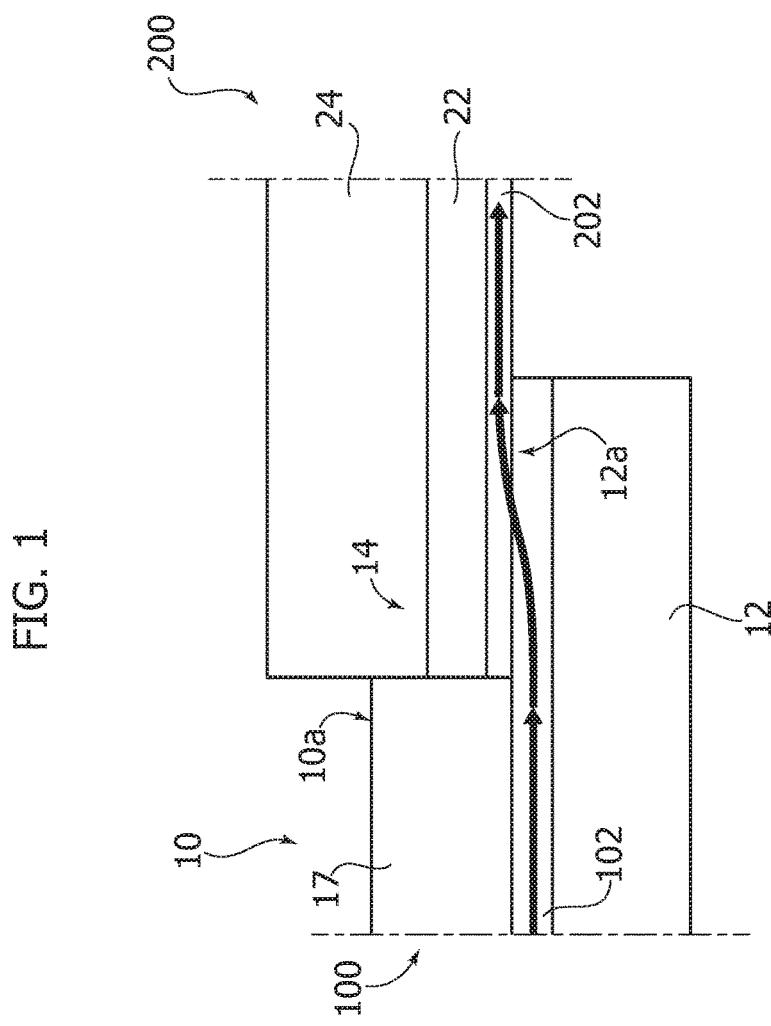

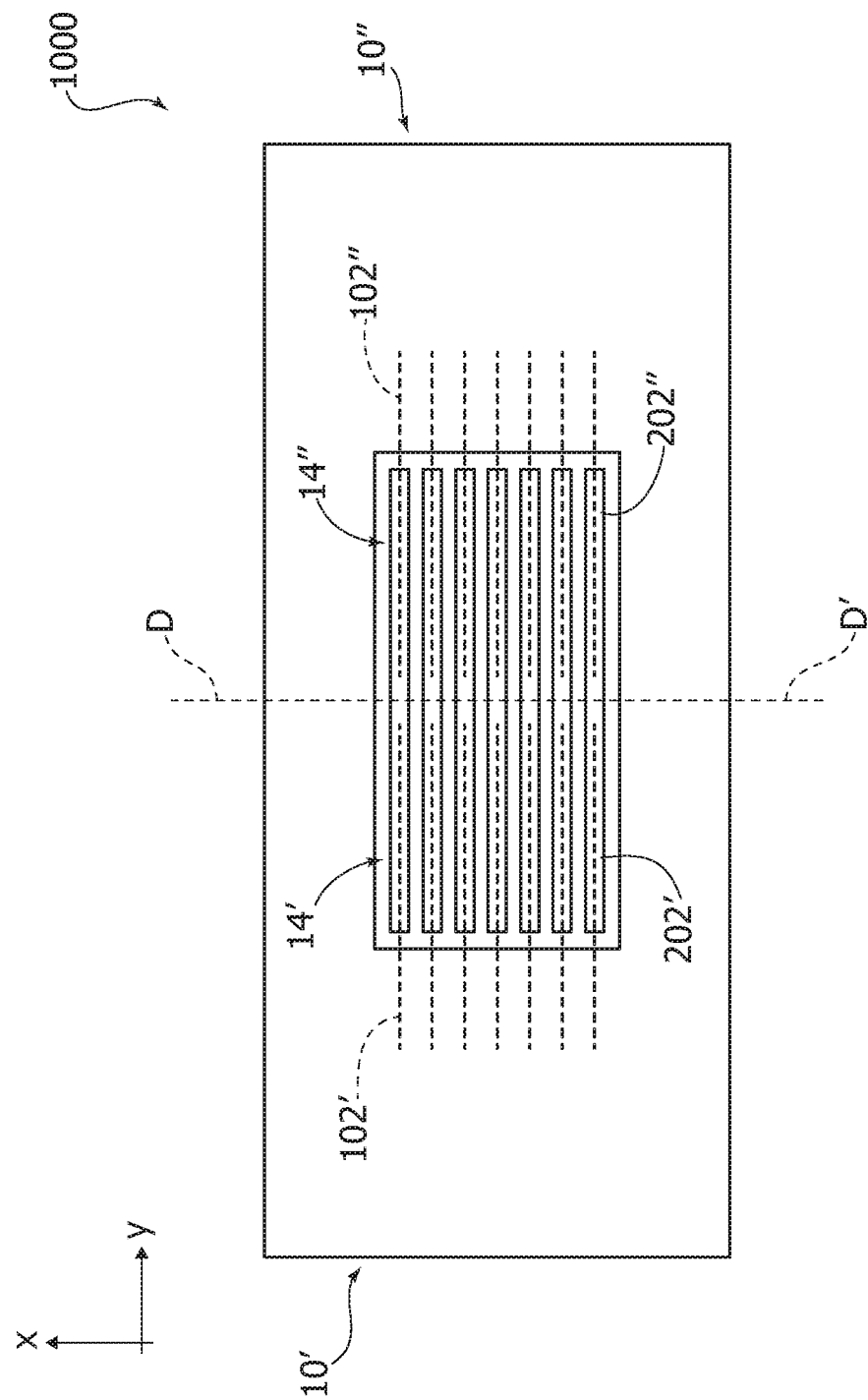

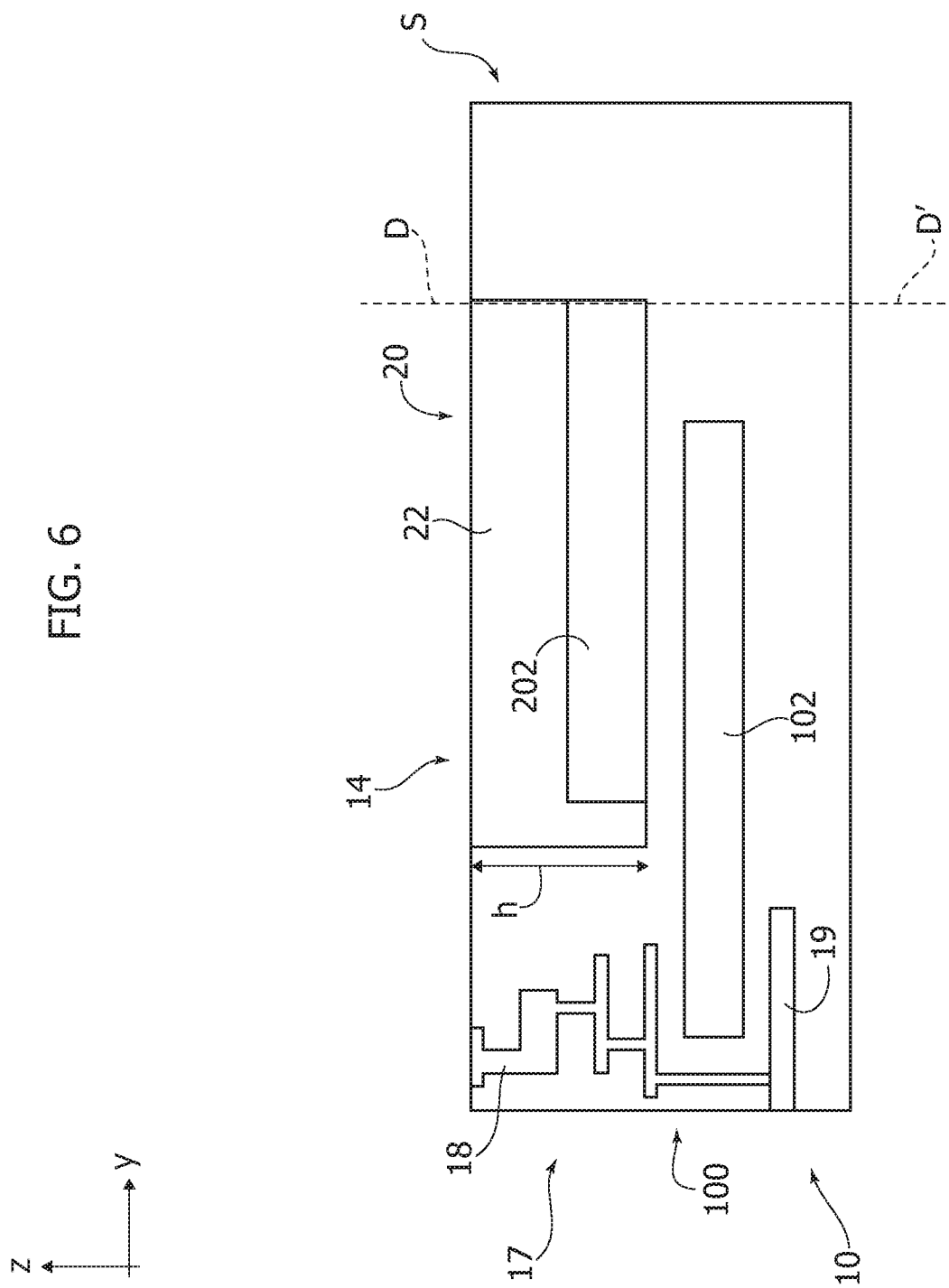

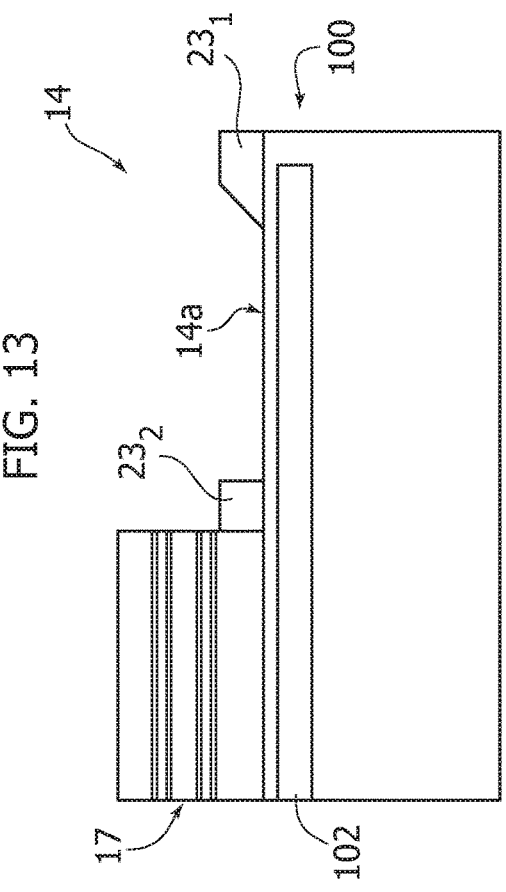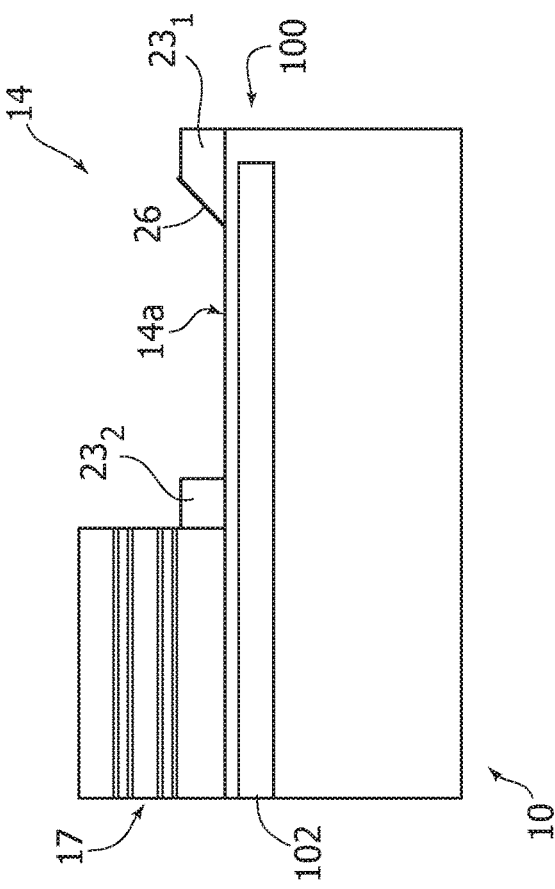

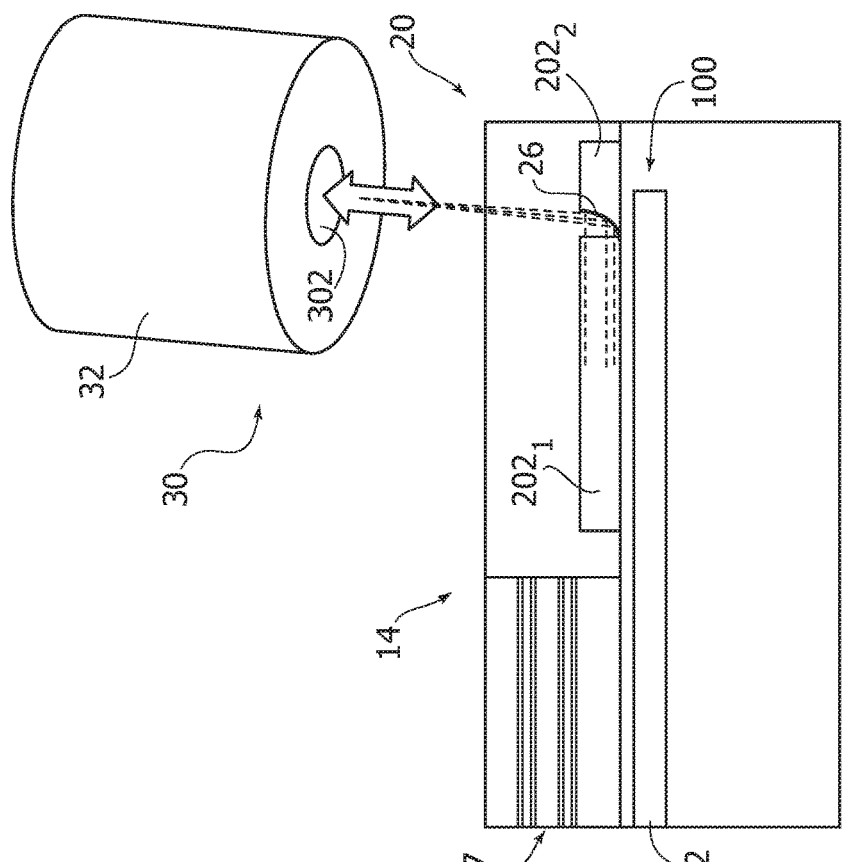
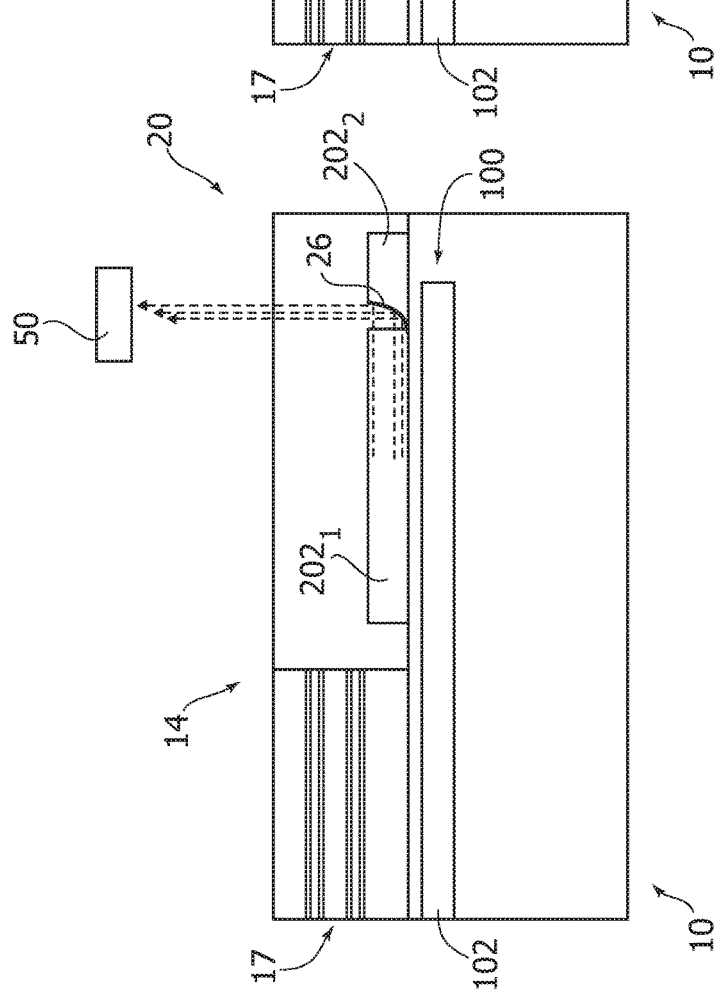

METHOD OF PRODUCING A DEVICE FOR ADIABATIC COUPLING BETWEEN WAVEGUIDE ARRAYS, CORRESPONDING DEVICE, AND SYSTEM

CROSS-REFERENCE TO RELATED APPLICATIONS

This application claims priority to Italian Patent Application No. 102018000005891, filed on May 31, 2018, which application is hereby incorporated herein by reference.

TECHNICAL FIELD

The description relates to optical waveguides in semiconductor devices. Silicon photonics chips comprising optical waveguides for coupling with optical interfaces are exemplary of such semiconductor devices.

BACKGROUND

Conventional techniques which may be used to couple light into waveguides include grating coupling and edge coupling.

An example of waveguide coupling, obtained through a grating coupling technology, is disclosed in Chiaretti, C.: "Towards the Industrial Deployment of the Silicon Photonics Technology", Proc. of the IEEE Bipolar/BiCMOS Circuits and Technology Meeting, 2013.

An example of light coupling into multiple fibers, wherein a fiber V block may be attached to a silicon photonics chip, is disclosed in Narasimha et al.: "An Ultra Low Power CMOS Photonics Technology Platform for H/S Optoelectronic Transceivers at less than $1 per Gbps", OFC, 2010.

An advantage of grating couplers may lie in that light may exit from a wafer surface, and not from an edge, which facilitates wafer level testing. Grating couplers may also exhibit an advantage in being able to couple to a top surface.

Grating couplers may have one or more disadvantages. For instance, loss over a large wavelength range may be higher away from a center design wavelength, see e.g. Wesley D. Sacher et al.,: "Wide bandwidth and high coupling efficiency Si3N4-on-SOI dual-level grating coupler", Optical Society of America, 2014.

For instance, a 4-lane Coarse Wavelength Division Multiplexing (CWDM4) may be derived from a PSM4 (Parallel Single Mode 4 lane) specification using e.g. CWDM4 wavelengths: 1271 nm, 1291 nm, 1311 nm, 1331 nm. This type of module may use a single fiber input for transmission (Tx) and a single fiber for reception (Rx), both with e.g. the 4 different "colors" (that is wavelengths) of light. Such an arrangement may provide an advantage for a customer insofar as, instead of, for instance, 4 Tx fibers and 4 Rx fibers (8 in total), the customer may only need to cable two fibers maintaining the quantity, e.g. Gbits, of information transmitted.

However, due to loss in the gratings, which also may be exposed to e.g. process variation and temperature, such an arrangement may not be suitable for broadband CWDM4 applications.

As already discussed previously, another conventional solution is provided by edge coupling. Edge coupling may have a disadvantage in lacking wafer level testing and in optical quality edge finish being possibly required.

SUMMARY

The description relates to optical waveguides in semiconductor devices.

Silicon photonics chips comprising optical waveguides for coupling with optical interfaces are exemplary of such semiconductor devices.

One or more embodiments can provide optical devices improved under various respects, such as improved optical coupling performance and/or adiabatic coupling realized at a wafer level.

In accordance with an embodiment, a method includes providing a semiconductor body comprising a surface with a recessed portion therein. The recessed portion includes a bottom surface. Optical waveguide cores in a first array of optical waveguide cores extend side-by-side at the bottom surface. The method further includes providing a second array of optical waveguide cores over the first array of optical waveguide cores. Optical waveguide cores in the second array of optical waveguide cores extend side-by-side. Each optical waveguide core in the second array of optical waveguide cores is in an adiabatic coupling relationship with a corresponding optical waveguide core in the first array of optical waveguide cores. The method also includes applying an optical waveguide cladding material over the second array of optical waveguide cores. The second array of optical waveguide cores and the optical waveguide cladding material applied thereon provide an optical fiber coupling interface.

In accordance with another embodiment, a device includes a semiconductor body, a first array of optical waveguide cores, a second array of optical waveguide cores, and optical waveguide cladding material. The semiconductor body includes a surface and a recessed portion disposed in the surface. The recessed portion includes a bottom surface. Optical waveguide cores in the first array of optical waveguide cores extend side-by-side at the bottom surface. Optical waveguide cores in the second array of optical waveguide cores extend side-by-side over the first array of optical waveguide cores. Each optical waveguide core in the second array of optical waveguide cores is in an adiabatic coupling relationship with a corresponding waveguide core in the first array of optical waveguide cores. The optical waveguide cladding material is disposed over the second array of optical waveguide cores. The second array of optical waveguide cores and the optical waveguide cladding material applied thereon provides an optical fiber coupling interface.

In accordance with still another embodiment, a system includes a device including a semiconductor body, a first array of optical waveguide cores, a second array of optical waveguide cores, and optical waveguide cladding material. The semiconductor body includes a surface and a recessed portion disposed in the surface. The recessed portion includes a bottom surface. Optical waveguide cores in the first array of optical waveguide cores extend side-by-side at the bottom surface. Optical waveguide cores in the second array of optical waveguide cores extend side-by-side over the first array of optical waveguide cores. Each optical waveguide core in the second array of optical waveguide cores is in an adiabatic coupling relationship with a corresponding waveguide core in the first array of optical waveguide cores. The optical waveguide cladding material is disposed over the second array of optical waveguide cores. The second array of optical waveguide cores and the optical waveguide cladding material applied thereon provides an optical fiber coupling interface. The system further includes an external optical connection apparatus coupled to the second array of optical waveguide cores in the optical fiber coupling interface.

One or more embodiments may provide one or more advantages, such as:
- wafer level approach facilitated,
- low-cost implementation, suitable for mass production,
- (precise) alignment of a polymer waveguide to a (e.g. SiN or Si) waveguide facilitated by resorting to a Front End process, which may be preferable to alignment based on packaging processes,
- glue attachment of an interposer to the optical waveguide may be avoided, which facilitates targeting nominal loss performance,
- final test at wafer level facilitated, and
- coupling with external optical waveguides (e.g. single mode fibers SMF) through e.g., standard edge coupling facilitated, so that expensive, tight assembly techniques may be avoided.

BRIEF DESCRIPTION OF THE DRAWINGS

One or more embodiments will now be described, by way of example only, with reference to the annexed figures, wherein:

FIG. 1 illustrates various features underlying adiabatic coupling,

FIG. 2 is an exemplary perspective view of a chip including embodiments;

FIGS. 3 to 6 represent exemplary features of a device according to embodiments;

FIGS. 13 to 18 and 18A illustrate exemplary features of a device according to embodiments; and FIGS. 19 and 20 illustrate non-limiting examples of systems according to embodiments.

Figure 5:
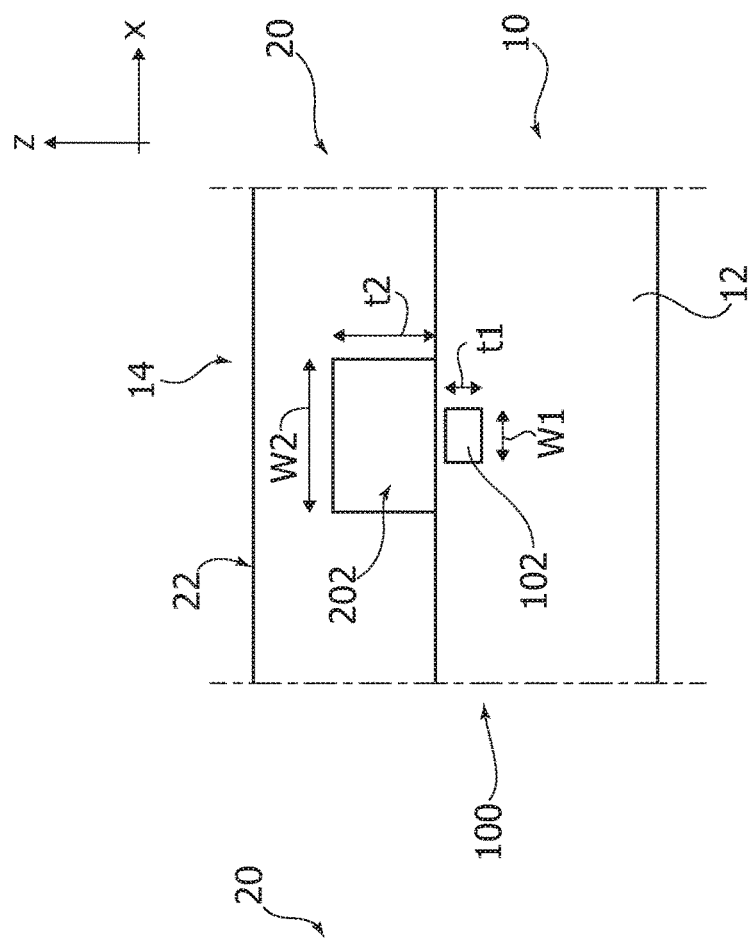

It will be appreciated that, for the sake of clarity and simplicity, the various figures, and portions of such figures, may not be drawn to a same scale.

Also, it will be appreciated that adoption of certain features exemplified herein (singly or in combination) in connection with a certain embodiment is not necessarily restricted to use with that embodiment. Stated otherwise, features or elements exemplified herein (singly or in combination) in connection with embodiments exemplified in a certain one of the annexed figures may be used (singly or in combination) in embodiments exemplified in any other of the annexed figures.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments can provide optical devices improved under various respects, such as improved optical coupling performance and/or adiabatic coupling realized at a wafer level.

According to one or more embodiments such an object may be achieved by means of a method having the features set forth in the claims that follow.

One or more embodiments may relate to a corresponding device (e.g. a device comprising an optical coupling interface realized with the method according to one or more embodiments) and a corresponding system (e.g. including a device and an external optical connection apparatus which may be, for example, one of an optical fiber or a photoelectric converter in an adiabatic coupling relationship with the device).

The claims are an integral portion of the disclosure of the invention as provided herein.

One or more embodiments may facilitate correct alignment of a first optical waveguide (e.g. an integrated waveguide) with a second optical waveguide (e.g. with polymer waveguide cores), which may be achieved even without a glue layer used during assembly.

One or more such embodiments may be implemented at a wafer level and, after a dicing step, the second (e.g. polymer) optical waveguide may be suitable for (e.g. standard edge) coupling with a third optical waveguide, for example a Single Mode Fiber, (SMF).

One or more embodiments may provide one or more advantages, such as: facilitating a wafer level approach, low-cost implementation, suitability for mass production, precision alignment of a polymer waveguide to a (e.g. silicon nitride or silicon) waveguide facilitated by a Front End process, which may be preferable to alignment based on packaging processes, avoiding glue attachment of an interposer to the optical waveguide facilitating targeting of nominal loss performance, facilitating final testing at wafer level, and coupling with external optical waveguides (e.g. single mode fibers) through e.g. standard edge coupling facilitated, so that expensive, tight assembly techniques may be avoided.

An optical coupling technique for an optical device may comprise (e.g. wide bandwidth) adiabatic coupling with different optical levels, comprising different materials.

FIG. 1 is a representation of certain principles underlying adiabatic coupling of optical waveguides applied to a silicon photonics chip 10 which contains a first optical waveguide 100.

An electromagnetic propagation (e.g. an electromagnetic wave exemplified in FIG. 1 by arrows pointing from left to right) may take place within the first optical waveguide 100 by being substantially confined within a first waveguide core 102 due to a difference in refractive index between the first waveguide core 102 and a waveguide cladding comprised in a substrate 12. The waveguide cladding may surround the first waveguide core 102. For instance, in the example considered herein, the cladding may comprise a layer of material surrounding the first waveguide core 102 and embedded in the substrate 12. That is, the first optical waveguide 100 may comprise various layers and the layers adjacent to the first waveguide core 102 may act as the cladding.

Also, above the substrate 12 and the first optical waveguide 100, Back End of Line (BEOL) layers 17 may be present.

In an optical coupling region, a portion of the BEOL layers 17 of the silicon photonics chip 10 may be at least partially removed, for example a portion of the BEOL layers 17 above the first waveguide core 102. For example, the BEOL layers 17 thereon may be completely removed, so that the first waveguide core 102 is exposed at a surface of the silicon photonics chip 10, or the cladding surrounding the first waveguide core 102 may comprise a small thickness, that may permit optical radiation (briefly "light") to "leak" out of the first optical waveguide 100. As shown in FIG. 1, an optical coupling portion of the first optical waveguide 100 may be provided at a recessed portion 14 (i.e. a cavity) of the front surface 10a of the silicon photonics chip 10, wherein at the optical coupling portion the light may be transmitted from the first waveguide core 102 of the optical waveguide at a surface 12a of the substrate 12. For example, the recessed portion 14 may be etched through the BEOL layers and may be formed at a lateral edge of the front surface 10a of the silicon photonics chip 10, with the recessed portion 14 having an open side at the lateral edge of the front surface.

A second optical waveguide 200 may be arranged at the optical coupling portion of the first optical waveguide 100. A second waveguide core 202 of the second optical waveguide 200 may thus be arranged overlapping the surface of the first optical waveguide 100 at the recessed portion 14 to produce a structure able to couple light between the first optical waveguide 100 and the second optical waveguide 200. For example, the second optical waveguide 200 may comprise the second waveguide core 202 embedded in one or more layers of waveguide cladding material, e.g. a lower layer (which may be a waveguide cladding 22) and an upper layer (which may be lenses 24) as exemplified in FIG. 1. The second waveguide core 202 may be exposed at a surface of the second optical waveguide 200 that may be arranged over the surface of the first optical waveguide 100 where the first waveguide core 102 is exposed at the recessed portion 14.

A specific design of the first optical waveguide 100 and the second optical waveguide 200, including width, refractive index, length etc., may determine the efficiency of the coupling between the first optical waveguide 100 and the second optical waveguide 200.

An adiabatic coupling arrangement as discussed previously can be regarded as per se conventional in the art. An example of adiabatic coupling between optical waveguides is described e.g. in Tymon Barwicz et al.: "Low-Cost Interfacing of Fibers to Nanophotonic Waveguides: Design for Fabrication and Assembly Tolerances", IEEE Photonics Journal, 2014, in which a tapered silicon waveguide is disclosed coupled to a rectangular polymer waveguide with a transition cladding provided by a bottom polymer layer and an epoxy layer used for attachment. The polymer waveguide may also include a fan out in order to increase the pitch between the waveguides, wherein a small pitch on the silicon chip may be e.g. a 250 µm (1 µm=$10^{-6}$ m) pitch as conventionally used in fiber ribbons. In addition, changing the waveguide dimensions may further facilitate coupling to an optical fiber. Also, an example of coupling between a polymer waveguide and a silicon photonic chip is known e.g. from Nicolas Boyer et al.: "Sub-Micron Bondline-Shape Control in Automated Assembly of Photonic Devices", IEEE, 2016.

Also, an example of optical waveguide featuring adiabatic coupling is found in Italian Patent Application No. 102017000032272 filed on Mar. 23, 2017 by the same Applicant, which is published as US Pat. Pub. No. 2018/0275342.

Known adiabatic coupling solutions between optical waveguides may comprise use of an interposer, see e.g. documents US 2016/0131837 A1 and U.S. Pat. No. 9,405,066 B2, which may comprise an array of waveguides realized separately and that may be coupled to an optical chip. In conventional approaches, the (e.g. polymer) interposer may be coupled to the optical chip via physical attachment.

However, it is observed that such an approach may exhibit one or more disadvantages, for example alignment of the (e.g. polymer) waveguides of the interposer on top of the (e.g. Silicon Photonics) optical chip may require an accurate control of an epoxy layer surrounding the waveguides and a high precision flip chip bonder and/or alignment structures (e.g. in the silicon). Also, current approaches feature a chip level approach that may be costly and may result in performance of the adiabatic coupling being affected by tolerances of packaging process, which can be detrimental for final coupling losses.

As previously discussed, arrangement of the polymer interposed on a silicon photonics chip may require high precision placement, for example a lateral precision of about +/−2 µm may not be acceptable, and a bond line thickness may be controlled, e.g. may be less than 2 µm over a length of the adiabatic coupling and for all the waveguide cores. That is, the coupling arrangement may have a positional tolerance of less than 2 µm.

Also, an epoxy layer used for the bonding of the interposer may also be controlled, having a thickness of less than 2 µm to facilitate a good optical coupling. For example, this may be achieved by using a special V-groove feature etched into the (e.g. silicon) optical device which may accurately locate the polymer indicative of the (e.g. silicon) waveguides, as can be available by IBM, 1 New Orchard Road, Armonk, N.Y. 10504-1722, United States. Such a solution, however, may result in a deep etch into the (e.g. silicon) wafer which may not be feasible in standard CMOS fabrications. Also, for example, high precision pick and place machines may be employed, such as those available from SET (131, Impasse Barteudet, 74490 Saint Jeoire, France), Amicra (Marie-Curie-Str. 6, D-93055 Regensburg, Germany) or Ficontec (Rehland 8, 28832 Achim, Germany). However, these machines may have a relatively low UPH (Unit per Hour) value and may be expensive. Also, it was observed that IBM has developed a passive process. However such a process may be possible e.g. if certain features of about 2 µm precision are present in the silicon chip and if a high precision flip chip alignment (of about +/−2 µm) is present.

According to one or more embodiments, a solution to the aforementioned drawbacks may comprise providing an optical interface (e.g. an adiabatic coupler, as discussed in the following) directly on an optical wafer (e.g. a 12 inch wafer), that may involve an extensive topography.

One or more embodiments will now be described with reference to figures from FIG. 2 onwards, wherein parts or elements like parts or elements already discussed in the foregoing will be indicated with like reference signs; a corresponding detailed description will not be repeated for brevity.

FIG. 2 is a perspective view of a non-limiting example of a silicon photonics chip 10 according to one or more embodiments represented in a 3D Cartesian space x-y-z, again having a recessed portion 14 (e.g. of about 8 μm) formed at a front surface 10a, for example by being etched through one or more BEOL layers on the front surface 10a of the silicon photonics chip 10. For example, such a recessed portion 14 may again be formed at a lateral edge of the front surface 10a of the silicon photonics chip 10, with the recessed portion 14 having an open side at the lateral edge of the front surface 10a.

It will be otherwise understood that a coupling arrangement as exemplified herein for simplicity in connection with a single recessed portion 14 in the silicon photonics chip 10 may be reproduced for a plurality of such cavities.

One or more embodiments may aim at providing, in the silicon photonics chip 10, a plurality of first waveguide cores (e.g. of silicon nitride) extending side-by-side at the inner or bottom surface 14a of the recessed portion 14 as schematically shown in dashed lines in FIG. 2.

References herein to first waveguide cores 102 extending "at" the inner or bottom surface 14a of the recessed portion 14 are intended to encompass the possibility for those first waveguide cores 102 to lie in (close) proximity of that surface, e.g. underneath the bottom surface 14a of the recessed portion 14 (as assumed throughout this description), and optionally to emerge at that surface.

For instance, in one or more embodiments, the first waveguide cores 102 may be surrounded by a layer of cladding material, e.g. a layer of silicon dioxide.

The recessed portion 14 etched through the BEOL layers 17 may comprise a bottom surface 14a that may expose the cladding material surrounding the plurality of first waveguide cores, arranged side-by-side in proximity of the bottom surface 14a of the recessed portion 14 as exemplified in FIG. 2.

The cladding material covering the plurality of first waveguide cores 102 in proximity of the bottom surface 14a of the recessed portion 14 may have a thickness that may permit adiabatic coupling with a second plurality of optical waveguide cores realized in the recessed portion 14 as described in the following. As shown in the same figure, alignment features 16 may be provided for use in providing the second plurality of optical waveguides as discussed in the following.

FIG. 3 is exemplary of a possible, non-mandatory approach in producing silicon photonics chips 10 as exemplified in FIG. 2.

FIG. 3 is a plan view (in a plane x-y) of a (single) piece of an optical wafer 1000 which can be regarded as comprising two silicon photonics chips 10', 10" in a face-to-face mirror symmetrical arrangement with respect to a plane D-D'.

The optical wafer 1000—which comprises in a one-piece arrangement the two silicon photonics chips 10', 10"—thus includes a central cavity with a closed perimeter which may in turn be regarded as formed by two recessed portions 14', 14" (i.e. cavities, each being formed in one of the two silicon photonics chips 10', 10" as discussed previously) having mutually facing open sides at the plane D-D'.

In one or more embodiments, respective portions of two pluralities of first waveguide cores 102', 102" (shown in dashed lines in FIG. 3) may then be provided (as discussed previously) in proximity of the bottom surfaces of the (still adjoining) recessed portions 14', 14".

A singulation step, performed (by any known means for that purpose) at the plane D-D', may then facilitate obtaining from the optical wafer 1000 two silicon photonics chips 10 as exemplified in FIG. 2.

In one or more embodiments, prior to such singulation step, respective portions of two pluralities of second waveguide cores 202', 202" (shown in full lines in FIG. 3) can be formed onto (e.g. in alignment with) the two pluralities of first waveguide cores 102', 102" and a cladding material (e.g. polymer) can be applied on the two pluralities of second waveguide cores 202', 202", e.g. by filling the recessed portions 14', 14" with the cladding material.

For example, the singulation process may employ a two-stage blade approach with a first blade cutting through the plane D-D', with the first blade having a narrower width with respect to a second blade that may be used to produce an optical quality finish for ends of the two pluralities of second waveguide cores 202', 202" at the plane D-D' that may enable e.g. edge coupling thereto. In one or more embodiments, also laser grooving can be used by using software to remove the BEOL layers external to the recessed portions 14', 14".

As a result of the processing steps exemplified herein, single silicon photonics chips 10 may thus be produced, each provided with an optical interface comprising the plurality of second waveguide cores 202' (202") formed onto the plurality of first waveguide cores 102' (102") with a cladding material applied on the plurality of second waveguide cores 202' (202"), with these latter cores exposed at the open side of the recessed portion 14' (14") of the silicon photonics chip 10' (10").

It will be otherwise appreciated that, while discussed herein for clarity and ease of understanding, the one just discussed represents only an exemplary, non-mandatory approach of producing a photonics chip 10 as exemplified in FIG. 2.

The two pluralities of second waveguide cores 202', 202" formed onto the two pluralities of first waveguide cores 102', 102" in FIG. 3 are thus generally exemplary of one possibility of providing in a recessed portion 14 of a silicon photonics chip 10 an optical interface comprising second waveguide cores 202 formed onto first waveguide cores 102 with a cladding material applied on the second waveguide cores 202.

Alternative approaches may however be adopted, for instance as discussed in the following in connection with FIG. 6 and FIG. 10, to achieve the same result.

For the sake of simplicity, the instant detailed description of exemplary embodiments will however be continued by referring to the exemplary approach introduced in FIG. 3, including singulation at the plane D-D'.

According to one or more embodiments, the two pluralities of second waveguide cores 202', 202" may be formed directly on the bottom surfaces of the two recessed portions 14', 14". The plurality of second waveguide cores 202 may include elongated formations of polymer material formed side-by-side in the two recessed portions 14', 14" at positions corresponding to the positions of the two pluralities of first waveguide cores 102', 102" of the silicon photonics chips 10', 10".

For instance, each waveguide core of the two pluralities of second waveguide cores 202', 202" may extend aligned over a respective waveguide core of the two pluralities of first waveguide cores 102', 102", with alignment facilitated by the alignment features 16 (e.g. reference marks) available on the silicon photonics chips 10', 10".

For instance, a stamp (not visible in the figures) may be used to fabricate—in a manner known to those of skill in the art—each individual waveguide core of the two pluralities of second waveguide cores 202', 202" within the recessed portions 14', 14". For example, the stamp may be made of transparent material and the two pluralities of second waveguide cores 202', 202" (e.g. polymer waveguide cores) may be fixed (cured) via UV light.

The stamp may advantageously be a reusable stamp such as a master stamp used to realize the two pluralities of second waveguide cores 202', 202". Additionally, hot embossing may be used during fabrication of the two pluralities of second waveguide cores 202', 202". For example, a master stamp may be heated during the fabrication process. The heating may aid in curing of the polymer material and/or facilitate shrinkage of the polymer material if desired.

Alternatively, a direct writing method may be employed in order to fabricate each individual waveguide core of the two pluralities of second waveguide cores 202', 202" within the recessed portions 14', 14". For instance, core material (e.g. polymer material) may be locally deposited at (e.g. within) the recessed portions 14', 14". Subsequently, each individual waveguide core of the two pluralities of second waveguide cores 202', 202" may be directly written (e.g. using a laser) into the core material. The unwritten core material may then be removed.

In other cases (e.g. when no additional chips are attached at the top of the wafer), lithography may also be used to fabricate each individual waveguide core of the two pluralities of second waveguide cores 202', 202" within the recessed portions 14', 14". For example, the core material (e.g. polymer material) may be spin coated over a top surface of BEOL layers and the recessed portions 14', 14". A thick photoresist film may then be spin coated over the core material and used as a mask (e.g. for etching of the core material) to fabricate the two pluralities of second waveguide cores 202', 202". Then, the photoresist film and any polymer material that is not part of the two pluralities of second waveguide cores 202', 202" may be removed.

In one or more embodiments, the two pluralities of second waveguide cores 202', 202" may comprise, e.g., 2 to 8 waveguide cores spaced with a pitch of, e.g., 100 to 250 μm.

In one or more embodiments, once the two pluralities of second waveguide cores 202', 202" is formed, cladding material may be applied (e.g. dispensed) within the closed-perimeter cavity in the optical wafer 1000 (that is within the recessed portions 14', 14"), with the cladding material embedding the two pluralities of second waveguide cores 202', 202" optionally filling the recessed portions 14', 14".

In one or more embodiments, the cladding material may thus be dispensed over the two pluralities of second waveguide cores 202', 202" and cured. In one or more embodiments, a stamp may be employed (in manner known to those of skilled in the art) for confining the cladding material. A stamp may be used for confining the cladding material irrespective of the method of fabricating the individual waveguide cores of the two pluralities of second waveguides 202', 202". For example, a stamp may be employed for confining the cladding material overlying the two pluralities of second waveguides 202', 202" fabricated by direct writing or hot embossing. Additionally, a separate second stamp may be used for confining the cladding material overlying the two pluralities of second waveguides 202', 202" fabricated with a first stamp.

The cladding material may also be formed using a lithography process (e.g. when no additional chips are attached at the top of the wafer). The cladding material may be deposited using a spin coating process over top surfaces of the BEOL layers, the two pluralities of second waveguides 202', 202", and the recessed portions 14', 14". A thick photoresist film may then be spin coated over the cladding material and used as a mask to define the cladding only in the recessed portions 14', 14". Then, the photoresist film and cladding material that is not in the recessed portions 14', 14" may be removed.

Alternatively, unwritten material (e.g. after a direct writing process) may be used as the cladding material. In such cases, the unwritten material is not removed from within the cavity after the direct writing process. In one embodiment, no material is removed when the unwritten material is used as the cladding material. During the direct writing process, the index of refraction of a core material (e.g. a polymer material) may be changed such that the written material functions as the core of the waveguides and the unwritten material functions as the cladding.

In one or more embodiments, after singulation, the silicon photonics chip 10 having formed thereon the optical interface discussed previously may be coupled (matched) to a plurality of third waveguide cores of e.g. an optical fiber ribbon.

In particular, the ends of the plurality of second waveguide cores 202 exposed, as discussed previously, at the open side of a recessed portion 14 (e.g. 14', 14") may be of optical quality and may be (e.g. edge) coupled with the optical fiber, as better described in the following.

Attachment/coupling may be achieved using standard alignment processes, e.g. with fibers in V grooves or (e.g. with only two fibers) UV transparent ferrules.

In one or more embodiments, the possibility exists of providing such an optical interface arrangement by (direct) coupling to the recessed portion 14 in the absence of an adhesive (e.g. epoxy) layer therebetween. This may be advantageous, e.g. insofar as control of the thickness of the epoxy, interfering with adiabatic coupling, may be avoided.

Also, the possibility exists of performing the step just discussed at a (e.g. 12-inch) wafer level and not at a single-die level: this may result in a higher throughput due to a reduced handling of parts.

By referring (with no limiting intent) to possible quantitative values, the plurality of second waveguide cores (e.g. 202, 202', 202") may have a refractive index of less than 1.57, for example of about 1.52 at about 1310 nm optical wavelength. The dimensions of the waveguide may depend on the refractive index and dimensions of the first waveguide cores 102, for example, silicon (Si) or silicon nitride (SiN). A material of the plurality of second waveguide cores (e.g. polymer waveguide cores) may be chosen having a refractive index higher than a refractive index of the cladding material, and lower than a refractive index of the plurality of first waveguide cores (e.g. 102, 102', 102") of the silicon photonics chip 10.

For instance (again these values are intended to be merely exemplary and non-limiting): the second waveguide core material and the cladding material may have a refractive index contrast of about 0.0065, a loss of the plurality of second waveguide cores (e.g. polymer) may be less than 0.4 dB/cm at about 1260-1340 nm of optical wavelength, the same parameters may be valid for a e.g. 1550 nm wavelength material, depending also on losses that may vary and may lead to choosing different types of polymer material better suited for a 1550 nm wavelength, and/or a profile of the section of the plurality of second waveguide cores may be of about 6 μm and may exhibit a tolerance of less than +/−0.5 μm.

Figure 4:
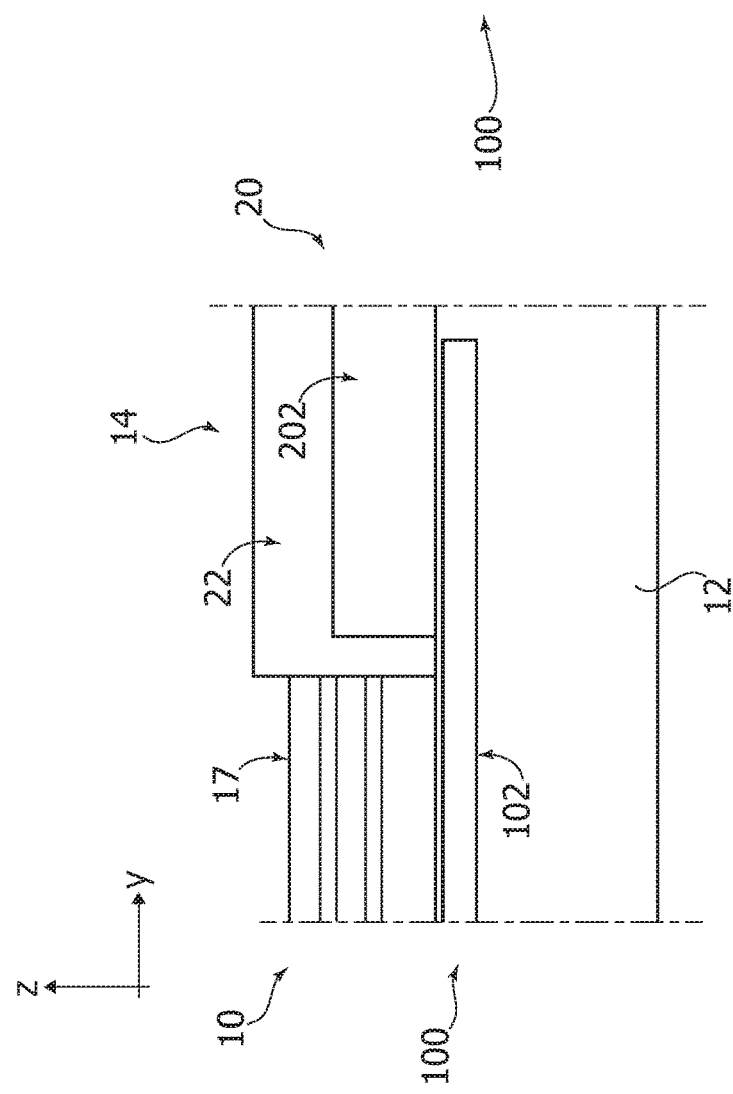

FIGS. 4 and 5 represent cross-sectional views of features of a silicon photonics chip 10 resulting from singulation at the plane D-D' of FIG. 3.

Since essentially an individual chip will be discussed in the following, the apex designations (that is, ' and ") used previously to identify the (symmetrical) elements in the optical wafer 1000 will dropped from now on for simplicity.

For example, FIGS. 4 and 5 represent cross-sectional views in a y-z plane and a x-z plane, respectively, of a portion of a silicon photonics chip 10 as exemplified in FIG. 2 having formed thereon at the recessed portion 14 an optical interface as discussed previously, designated 20 as a whole. For example, the cross-sectional view of FIG. 5 may represent a portion of the silicon photonics chip 10 in an intermediate point of the recessed portion 14 (e.g. away from the open side thereof).

As represented in FIG. 4, the silicon photonics chip 10 may comprise the substrate 12 having thereon one or more BEOL layers 17. Again, the recessed portion 14 may be etched in the BEOL layers 17 that may comprise, alternatingly, passivation layers and metal layers.

In one or more embodiments, the substrate 12 below the BEOL layers 17 may comprise the first optical waveguide 100 with a first waveguide core 102 (only one is visible in FIG. 5 for simplicity and ease of understanding) and cladding, that is a (e.g. thin) layer of material surrounding the first waveguide core 102.

It will be appreciated that, in one or more embodiments, the first waveguide core 102 which is adiabatically coupled to a corresponding second waveguide core 202 (again, only one of these waveguide cores is visible in FIG. 5 for simplicity and ease of understanding) may not reach a lateral surface of the silicon photonics chip 10: see the right hand side of FIG. 4.

That is, the plurality of first waveguide cores 102 may end within the substrate 12 of the silicon photonics chip 10 without reaching a lateral surface thereof (as possibly defined by the singulation plane D-D').

As exemplified herein, the cladding material surrounding the first waveguide core 102 may be exposed at the bottom surface 14a of the recessed portion 14, with the first waveguide core 102 extending in proximity of the bottom surface 14a at a certain depth within the substrate 12 facilitating adiabatic coupling as discussed previously.

In one or more embodiments, the optical interface 20 may thus be formed in the recessed portion 14, and may have lateral and longitudinal dimensions substantially corresponding to lateral and longitudinal dimensions of the recessed portion 14 of the silicon photonics chip 10.

In one or more embodiments as exemplified in FIGS. 4 and 5, the first waveguide core 102 of the first optical waveguide 100 may be smaller than the second waveguide core 202. For instance, a thickness t1 and a lateral width w1 of the first waveguide core 102 of the first optical waveguide 100 may be smaller than a thickness t2 and a lateral width w2 of the second waveguide core 202.

In one or more embodiments, by forming the second waveguide cores 202 (directly) above the first waveguide cores 102 within the silicon photonics chip 10, the possibility exists of retaining a positional tolerance of, e.g., about 2 μm of the second waveguide cores 202 with respect to the first waveguide cores 102.

In one or more embodiments, the optical interface 20 may thus have a lateral surface, at the open side of the recessed portion 14 of the silicon photonics chip 10. For example, in an example of optical interface 20 as discussed previously, at the lateral surface of the optical interface 20 the plurality of second waveguide cores 202 may be exposed and available for edge coupling with a (third) optical waveguide (see, for instance, fiber 30 in FIGS. 7 and 9).

FIG. 6 shows a non-limiting example of a cross-sectional view in a plane y-z of a silicon photonics chip 10 produced according to another approach with respect to the one discussed previously in connection with FIG. 3, that is by forming an optical interface 20 as considered herein in a silicon photonics chip 10 with the chip coupled with a sacrificial test chip S arranged at a lateral surface corresponding to the open side of the recessed portion 14 with the silicon photonics chip 10 having the optical interface 20 provided thereon separated from the sacrificial test chip S via dicing at a plane D-D' (the same designation of the singulation plane of FIG. 3 is retained for simplicity).

For instance, as exemplified in FIG. 6, the recessed portion 14 of the silicon photonics chip 10 may comprise a height h of about 8 μm.

As exemplified in the left-hand side of FIG. 6, in one or more embodiments, the optical interface 20 provided on the silicon photonics chip 10 may comprise (irrespective of the realization approach adopted) various other elements, in addition to the first waveguide core 102 of the first optical waveguide 100 of e.g. silicon nitride (SiN) and the waveguide cladding surrounding the first waveguide core 102 of an oxide, e.g. silicon dioxide.

These other elements may comprise (as known to those of skill in the art) electrically-conductive (e.g. metal) vias 18, further waveguide cores 19 of e.g. silicon, further waveguide cladding, surrounding the further waveguide cores 19, of e.g. silicon dioxide, in the silicon bulk.

For instance (of course the quantitative data given below are merely exemplary and are not to be construed, even indirectly, in a limiting sense of the embodiments): the first waveguide core 102 comprising silicon nitride may have a thickness of e.g. 600 nm and a refractive index of about 1.9142, the cladding material, e.g. silicon dioxide, surrounding the first waveguide core 102 may have a refractive index of about 1.46 and a thickness of about 50 nm above (i.e. towards the recessed portion 14) the first waveguide core 102 and a thickness of about 100 nm below (e.g. away from the recessed portion 14) the first waveguide core 102, a layer of silicon nitride may be provided below the first waveguide core 102, e.g. between the first waveguide core 102 and the further waveguide cores 19, the layer of silicon nitride having a refractive index of about 1.892 and a thickness of about 57 nm, the further waveguide cores 19, of e.g. silicon, may have a thickness of about 306 nm and a refractive index of about 3.506, a cladding layer of the further waveguide cores 19, e.g. of silicon dioxide, having refractive index of about 1.46 and a thickness of about 28 nm, may be provided above (i.e. towards the layer of silicon nitride) the further waveguide cores 19, a buried oxide (BOX) layer may be arranged underneath the further waveguide cores 19 away from the layer of silicon nitride, the layer having a thickness of about 1500 nm and a refractive index of about 1.446, and a silicon layer may be provided underneath the BOX layer away from the further waveguide cores 19 and having a refractive index of about 3.506.

FIG. 6 exemplifies that, as previously discussed, in one or more embodiments, the recessed portion 14 may be etched (only) through the metal and passivation layers of the BEOL layer 17. For instance, the recessed portion 14 may be etched so that a thin layer of oxide may be present above the (e.g., SiN) waveguide cores 102 as represented in FIG. 6, with such layer sufficiently thin as to avoid affecting adiabatic coupling of the first waveguide core 102.

In that respect, it will be once more recalled that adoption of certain features exemplified herein (singly or in combination) in connection with a certain embodiments is not necessarily restricted to use with that embodiment. Stated otherwise, feature or elements exemplified herein (singly or in combination) in connection with embodiments exemplified in a certain one of the annexed figures may be used (singly or in combination) also in embodiments exemplified in any other of the annexed figures.

Figure 7:
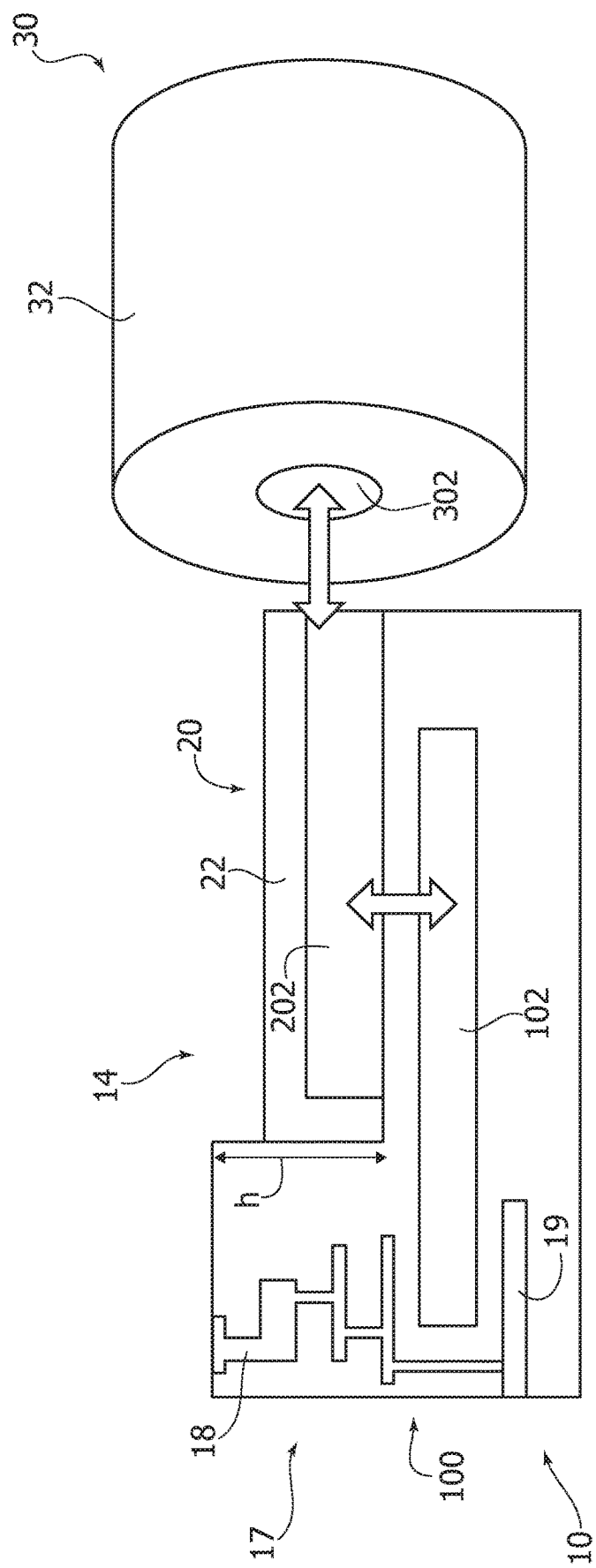
FIG. 7 illustrates a non-limiting example of a system according to embodiments.

FIG. 7 is a cross-sectional view in a plane y-z illustrative of the possible use of an interface 20 as exemplified herein in facilitating coupling a (third) optical waveguide (e.g. single mode fiber) to the silicon photonics chip 10 by taking advantage of the adiabatic coupling of the first waveguide core 102 and the second waveguide core 202 of the optical interface 20 (e.g. polymer optical interface).

The fiber 30 (e.g. single mode fiber) may comprise a plurality of third waveguide cores 302 (again only one of these is shown for simplicity and ease of understanding) and waveguide cladding 32, surrounding the plurality of third waveguide cores 302.

The fiber 30 may be place directly in contact (e.g. abutted) to the plurality of second waveguide cores 202 of the optical interface 20, e.g. at end portions thereof exposed at the lateral side of the optical interface 20 at the open side of the recessed portion 14.

As exemplified herein, the plurality of first waveguide cores 102, the plurality of second waveguide cores 202 and the plurality of third waveguide cores 302 may provide an optical light transmission mechanism, herein exemplified with double arrows.

The basic arrangement underlying one or more embodiments lends itself to a variety of possible implementation details.

For instance, the recessed portion 14 may be completely filled with waveguide cladding 22, see e.g. FIG. 6, or the waveguide cladding 22 may embed the plurality of second waveguide cores 202 without completely filling the recessed portion 14, see e.g. FIG. 7. Also, as exemplified in FIG. 4, the waveguide cladding 22 may at least slightly "overflow" from the recessed portion 14.

In one or more embodiments, a length of the optical interface 20 (y-axis in the figures) may be of about 4-5 mm, that may be smaller with respect to a length of optical interposers known in the prior art. Such a length may facilitate reducing overall loss of the optical coupling system.

In one or more embodiments, a pitch of the optical interface 20 (that is, the spacing pitch between the central axes of the first waveguide core 102 and the second waveguide core 202 arranged side-by-side) can be matched to a pitch of an available fiber block/ferrules for the fiber 30.

One or more embodiments may otherwise lend themselves to use in connection with fan out systems to increase the pitch. The same may also apply to Mode Field Diameter MFD expansion.

Figure 8:
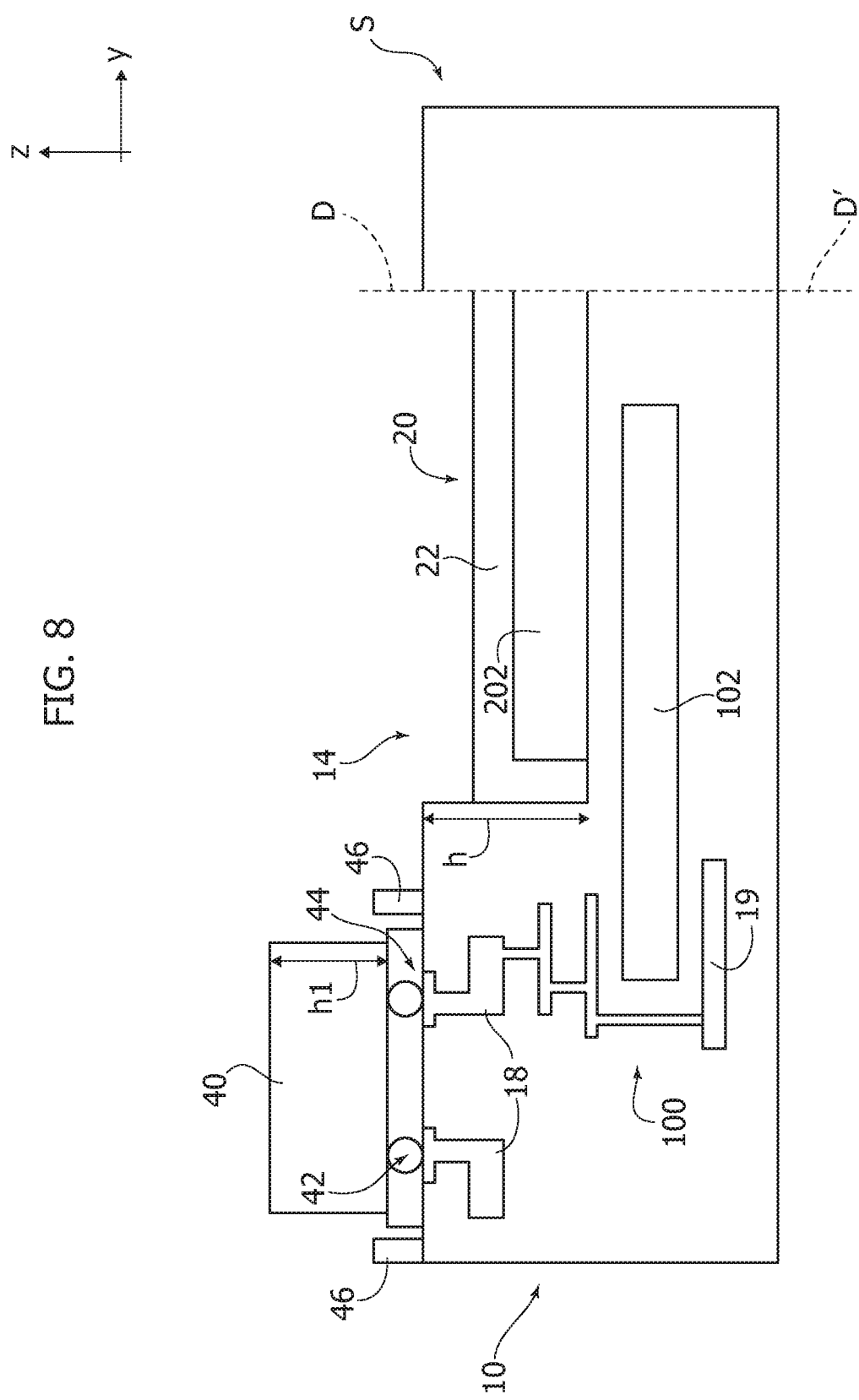
FIG. 8 illustrates exemplary features of a device according to embodiments.
Figure 9:
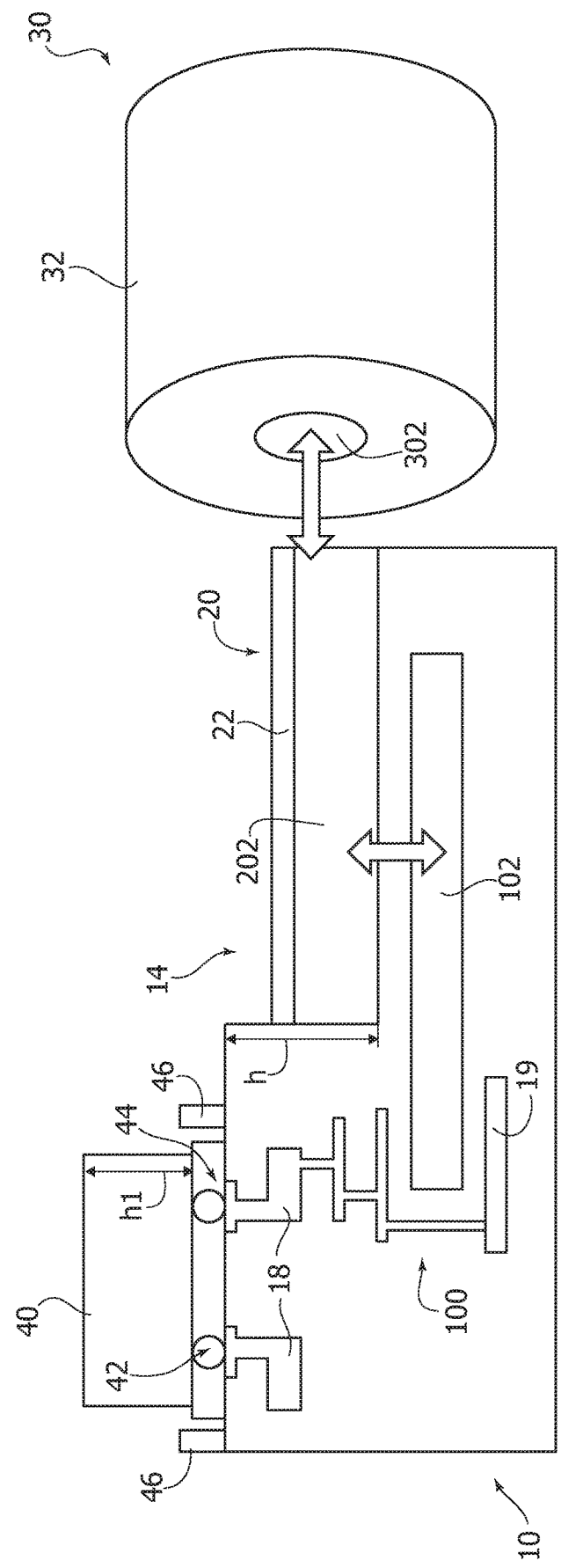
FIG. 9 illustrates a non-limiting example of a system according to embodiments.

FIGS. 8 and 9, where parts or elements like parts or elements already discussed previously are indicated with like references (so that a corresponding detailed description will not repeated for the sake of brevity), exemplify possible arrangements of a system according to one or more embodiments observed in a cross-sectional views in a plane y-z.

FIGS. 8 and 9 are exemplary of the possibility, in one or more embodiments, of arranging onto the silicon photonics chip 10 (reference is made in FIG. 8 by way of example to a silicon photonics chip 10 separated from a sacrificial test chip S at a dicing plane D-D') at least one electrical integrated circuit (EIC) 40. The EIC may have, for instance, a height h1 of e.g. about 400 μm.

For example, the EIC 40 may be attached to the front surface 10a of the silicon photonics chip 10, sidewise with respect to the recessed portion 14 similarly formed in the front surface 10a through the BEOL layer 17. Also, the EIC 40 may be connected to the silicon photonics chip 10 via electrically-conductive (e.g. copper, Cu) pillars 42, and underfilling material 44 may be applied between the EIC 40 and the first optical waveguide 100. Also, electrically-conductive (e.g. nickel) formations 46 may be provided surrounding the EIC 40, as exemplified in FIG. 8.

Attachment of the EIC 40 may be realized at wafer level, either before or after the formation of the optical interface 20.

The silicon photonics chip 10 with the EIC 40 mounted thereon may be coupled (once singulated) to the fiber 30 via the optical interface 20, as exemplified in FIG. 9.

Figure 10:
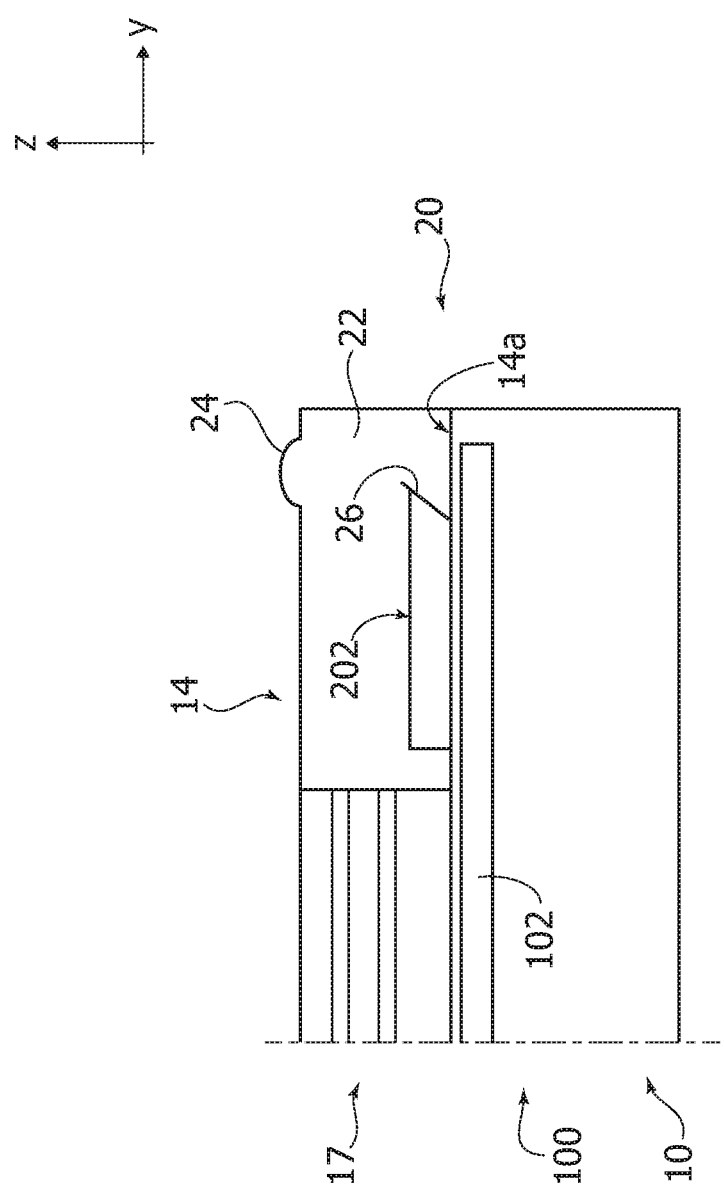
FIG. 10 illustrates exemplary features of a device according to embodiments.

As exemplified in the cross-sectional view in the y-z plane of FIG. 10, in one or more embodiments the possibility exists of replacing the butt (end) coupling to the fiber 30 as exemplified in FIGS. 7 and 9 with a deflecting mirror arrangement including "turning" mirrors configured to provide a deflected propagation path (e.g. with a 90° turn) between each second waveguide core 202 and a respective lens of the lenses 24, that may be configured for collimating or focusing a beam.

For example, a respective lens of the lenses 24 may be hemispherical, and may be arranged at (e.g. over) a surface of the optical interface 20 opposite with respect to a surface in contact with the bottom surface 14a of the recessed portion 14.

In a possible implementation of such an embodiment, the plurality of second waveguide cores 202 in the array of second waveguide cores 202 may be formed so that mirror-like (e.g. metalized) surfaces (e.g. mirrors 26) at 45° with respect to the longitudinal direction (y-axis) of the second waveguide cores 202 may be provided at the ends of the plurality of second waveguide cores 202, for instance at the ends of the plurality of second waveguide cores 202 towards the open side of the recessed portion 14.

Also, in the present non-limiting example, the plurality of second waveguide cores 202 of the optical interface 20 may be formed embedded in waveguide cladding 22 and may not be exposed at the open side of the recessed portion 14.

Figure 11:
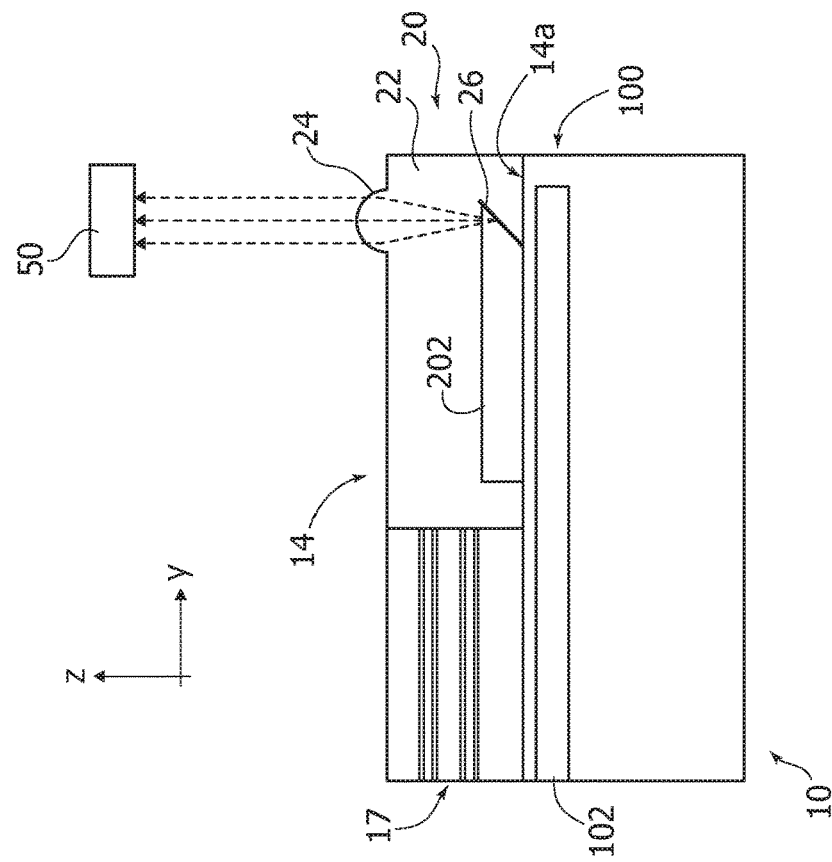
FIG. 11 illustrates a non-limiting example of a system according to an embodiment.
Figure 12:
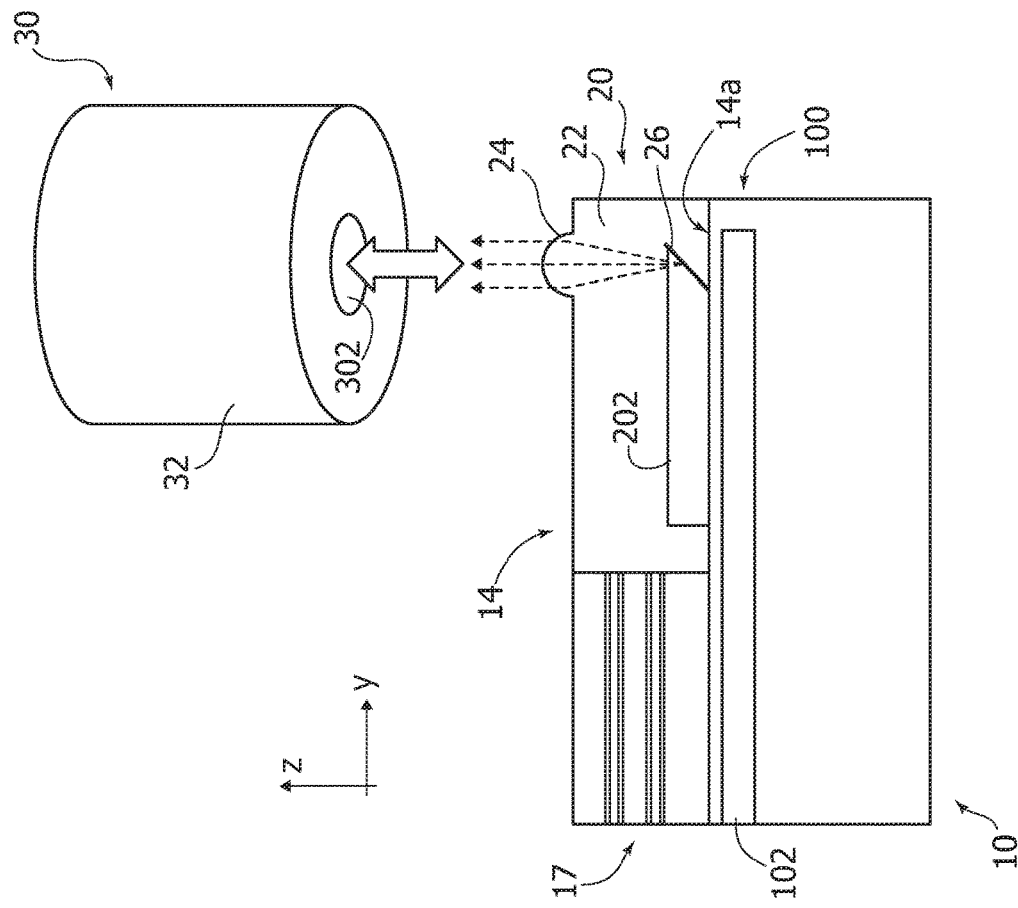
FIG. 12 illustrates a non-limiting example of a system according to another embodiment.

In one or more embodiments as exemplified herein, lenses such as the respective lens of the lenses 24, e.g. focusing lenses, may in turn be coupled with a (third) waveguide like the fiber 30 (e.g. optical) exemplified in FIG. 11 or with an external optical connection apparatus such as photoelectric converter 50 (e.g. a photodetector or an electrically-powered optical radiation source) as shown in FIG. 12. The light radiation passing through the lenses 24 and the plurality of second waveguide cores 202 may be exemplified by arrows in FIGS. 11 and 12.

In one or more embodiments, the lenses 24 may provide a collimated beam. The lenses 24 may be thus coupled to a fiber 30, comprising a further lens configured for interfacing with the lenses 24 producing the collimated beam and for focusing the light into the fiber 30. Such a solution may provide one or more advantages, for example "relaxed" alignment tolerances.

In one or more embodiments, an optical interface 20 as exemplified in FIG. 10 may be formed, see e.g. FIG. 13, by printing support structures, for example, first support structures 23₁ for the mirrors 26 and, optionally, second support structures 23₂ for confining the plurality of second waveguide cores 202. Such support structures may comprise polymer material, e.g. of the same type as the waveguide cladding 22, and may be printed directly on the bottom surface 14a of the recessed portion 14.

Also, in one or more embodiments, the first support structures 23₁ for the mirrors 26 may exhibit angled (e.g. of 45°) lateral surfaces.

In one or more embodiments, the method of producing the optical interface 20 as exemplified in FIG. 10 may comprise, see e.g. FIG. 14, producing mirrors 26 (e.g. metalized) by metalizing the angled (e.g. 45°) lateral surfaces of the first support structures 23₁, e.g. by applying metal material over the first support structures 23₁ having angled lateral surfaces. The mirrors 26 may thus comprise 45° angled mirrors having a metalized face away from the open side of the recessed portion 14.

Figure 15:
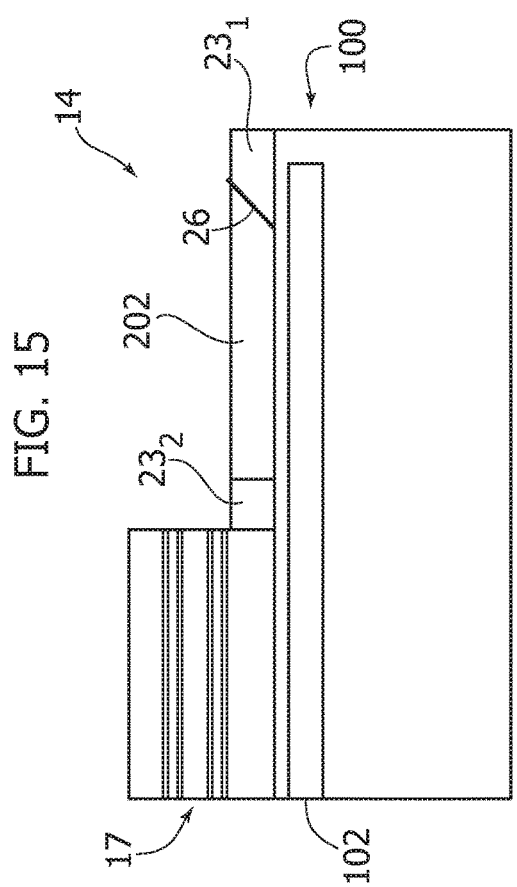

In one or more embodiments, the method of producing the optical interface 20 as exemplified in FIG. 10 may comprise, see e.g. FIG. 15, printing the (e.g. polymer) waveguide cores 202 as discussed previously with end surfaces in contact with respective mirrors 26, wherein the plurality of second waveguide cores 202 may be printed in the recessed portion 14 in portions thereof that may be enclosed by the first and second support structures 23₁, 23₂.

Figure 16:
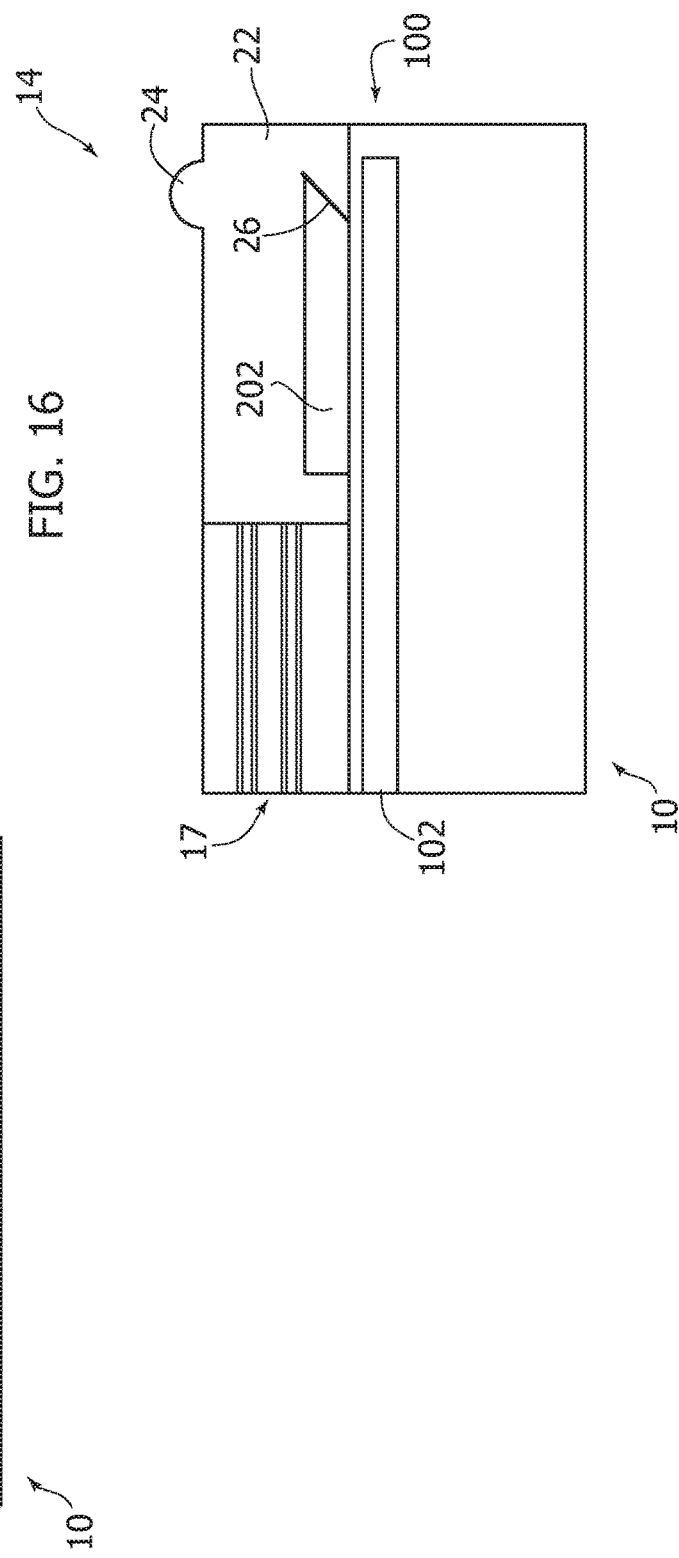

In one or more embodiments, the method of producing the optical interface 20 as exemplified in FIG. 10 may comprise, see e.g. FIG. 16, printing the waveguide cladding 22 comprising the lenses 24 (e.g. collimating lenses or focusing lenses), also embedding the first and second support structures 23₁, 23₂ and the plurality of second waveguide cores 202 comprising the metalized mirrors 26 as end surfaces.

Figure 17:
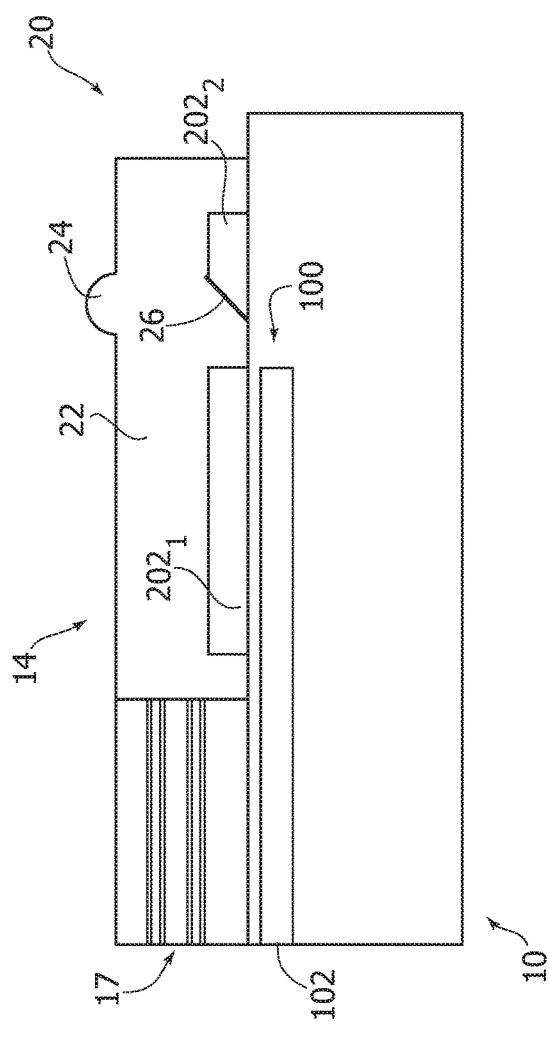

In one or more embodiments, as exemplified in FIG. 17, the method of producing the optical interface 20 may comprise printing each second waveguide core 202 in the recessed portion 14 by: printing a first elongated portion (i.e. a first portion 202₁), as discussed previously, and printing, at a distance with respect to the first elongated portion, (i.e. a second portion 202₂), that may substantially correspond, in shape and position, to the first support structure 23₁ for the mirrors 26.

The step of producing the mirrors 26, in the embodiment considered, may thus comprise printing the mirrors 26 directly on the second portions 202₂ of the plurality of second waveguide cores 202.

Also, the waveguide cladding 22 may be applied in the recessed portion 14 on the first and second portions 202₁, 202₂ of the plurality of second waveguide cores and on the mirrors 26. The lenses 24 may be realized as previously discussed.

In the considered embodiment, the mirrors 26 may be fabricated on the second waveguide core 202 material with a cap to the second waveguide core 202.

Also, in the considered embodiment, a (e.g. small) distance may be present between the first and second portions 202₁, 202₂ of each second waveguide core 202, with such distance filled with cladding material, wherein "free space propagation" of the light may occur. Again, the mirrors 26 may reflect the light though the waveguide cladding 22.

Figure 18A:
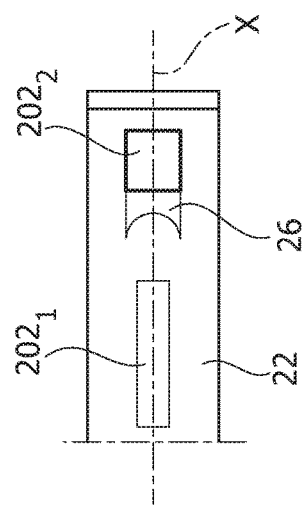
Figure 18:
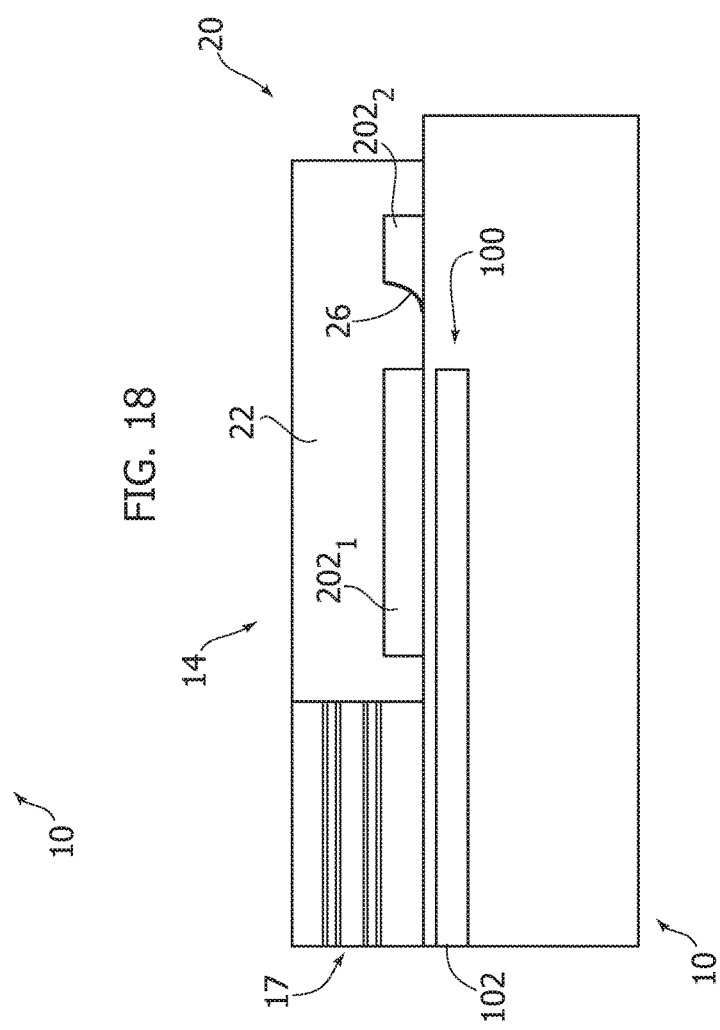

In one or more embodiments, as exemplified in FIGS. 18 to 20, the first support structures 23₁ or the second portions 202₂ of the plurality of second waveguide cores 202 (as exemplified in the figures) may have lateral end surfaces with various shapes, for example to realize mirrors 26 with a concave shape.

In one or more embodiments employing such a concave shape, the lenses 24 may be absent, in fact the mirrors 26 themselves may be able to focus or collimate light, thus acting as reflective-type optics in the place of refractive-type optics as provided by the lenses 24 discussed previously.

For example, the shape of the mirrors 26 (e.g. concave) may comprise a parabolic shape suitable to facilitate collimating a beam or an elliptical shape to facilitate beam focusing.

FIG. 18A represents a non-limiting example of a top view of a portion of the optical interface 20, exhibiting an axis X corresponding to the axis of the cross-sectional view of FIG. 18. The elliptical shape of the mirror 26 is thus exemplified in FIG. 18A, with the concave part thereof towards the first portion 202₁ of the second waveguide core 202 that may be arranged at a distance with respect to the mirror 26.

As exemplified in FIGS. 19 and 20, the optical interface 20 may thus couple with an external photoelectric converter 50 or a fiber 30, respectively. The fiber 30 may be arranged orthogonally with respect to the bottom surface 14a of the recessed portion 14 or may be arranged obliquely with respect to the bottom surface 14a.

In the figures, the light radiation passing through the first and second portions 202₁, 202₂ of the plurality of second waveguide cores may be exemplified by arrows. In FIG. 19, the mirrors 26 (e.g. concave) may comprise a parabolic shape suitable for collimating the light radiation; conversely, in FIG. 20, the mirrors 26 (e.g. concave) may comprise an elliptical shape suitable for focusing the light radiation.

For a technological viewpoint, optical interfaces 20 as discussed throughout this detailed description may be realized via different methods. For example, one or more embodiments may involve hot embossing, including: local deposition in the recessed portion 14 of polymer material used for the plurality of second waveguide cores 202, use of a master stamp for realizing the plurality of second waveguide cores 202, heating the master stamp for curing the polymer material and, optionally, shrink the polymer material if desired, and local deposition in the recessed portion 14 of the polymer material used for the waveguide cladding 22.

One or more embodiments may adopt a lithography process, comprising: spin coating polymer material used for the second waveguide cores 202, spin coating a thick photoresist or providing a photoresist film, masking and realizing the plurality of second waveguide cores 202, removal of the photoresist and non-developed polymer material, spin coating of polymer material used for the waveguide cladding 22, spin coating of a thick photoresist or providing a photoresist film, masking and definition of the waveguide cladding—only within the cavity, and removal of the photoresist and non-developed polymer.

Also, one or more embodiments, may adopt (e.g. nano) printing technology, comprising: local deposition in the recessed portion 14 of polymer material used for the plurality of second waveguide cores 202, use of a master stamp for realizing the plurality of second waveguide cores 202, and local deposition in the cavity of polymer material used for the waveguide cladding 22.

One or more embodiments may thus relate to a method, comprising: providing a semiconductor body (e.g. 10) having a surface (e.g. 10a) with a recessed portion (e.g. a recessed portion 14) therein, the recessed portion having a bottom surface (e.g. 14*a*) with a first array of optical waveguide cores (e.g. 102) extending side-by-side at (e.g. in proximity of, underneath) the bottom surface, providing onto the first array of optical waveguide cores a second array of optical waveguide cores (e.g. 202; 202₁, 202₂) extending side-by-side, the optical waveguide cores in the second array of optical waveguide cores in adiabatic coupling relationship with the optical waveguide cores in the first array of optical waveguide cores, and applying optical waveguide cladding material (e.g. 22) onto the second array of optical waveguide cores, wherein the second array of optical waveguide cores having the optical waveguide cladding material applied thereon may provide an optical fiber coupling interface (e.g. 20).

In one or more embodiments, providing the second array of optical waveguide cores onto the first array of optical waveguide cores may comprise forming the optical fiber coupling interface through one of printing, hot embossing or lithography.

One or more embodiments may comprise providing the optical waveguide cores in the second array of optical waveguide cores larger in size than the optical waveguide cores in the first array of optical waveguide cores.

One or more embodiments may comprise providing the recessed portion at an edge of the surface (e.g. at a lateral surface of the semiconductor body), wherein the recessed portion may have an open side.

One or more embodiments may comprise: providing a precursor semiconductor body (e.g. 1000; 10, S) including at least one said semiconductor body (e.g. 10'; 10) arranged with its recessed portion bordering at a bordering plane (e.g. D-D') with a complementary semiconductor body (e.g. 10"; S) forming a closed-perimeter recessed portion in the precursor semiconductor body, with at least one array of first optical waveguide cores (e.g. 102'; 102) extending side-by-side at (e.g. in proximity of, underneath) the bottom surface of the recessed portion forming a closed-perimeter recessed portion in the precursor semiconductor body, providing onto the at least one array of first optical waveguide cores a second array of optical waveguide cores (e.g. 202'; 202) extending side-by-side, the optical waveguide cores in the second array of optical waveguide cores in adiabatic coupling relationship with the optical waveguide cores in the at least one array of first optical waveguide cores, and applying optical waveguide cladding material (e.g. 22) onto the second array of optical waveguide cores, and severing the precursor semiconductor body at the bordering plane to separate at least one said semiconductor body from the complementary semiconductor body.

One or more embodiments may comprise: providing a precursor semiconductor body (e.g. 1000) including a first (e.g. 10') and a second (e.g. 10") said semiconductor body (e.g. 10) arranged in face-to-face relationship with respective first (e.g. 14') and second (e.g. 14") recessed portions bordering in face-to-face relationship at said bordering plane (e.g. D-D') forming a closed-perimeter recessed portion in the precursor semiconductor body, with arrays of first optical waveguide cores (e.g. 102', 102") extending side-by-side at (e.g. in proximity of, underneath) the bottom surfaces of the first and second recessed portions bordering in face-to-face relationship at the bordering plane, providing onto the arrays of first optical waveguide cores a second array of optical waveguide cores (e.g. 202', 202") extending side-by-side, the optical waveguide cores in the second array of optical waveguide cores in adiabatic coupling relationship with the optical waveguide cores in the arrays of first optical waveguide cores, applying optical waveguide cladding material (e.g. 22) onto the second array of optical waveguide cores, and severing the precursor semiconductor body along the bordering plane to separate the first and second semiconductor bodies.

One or more embodiments may comprise coupling to the second array of optical waveguide cores, having the optical waveguide cladding material applied thereon, one of an array of optical fibers (e.g. 302) and a photoelectric converter (e.g. 50), wherein the optical fibers in the array of optical fibers or the photoelectric converter may be coupled to the optical waveguide cores in the first array of optical waveguide cores via the waveguide cores of the second array of optical waveguide cores.

One or more embodiments may comprise butt coupling the optical fibers in the array of optical fibers to the optical waveguide cores in the second array of optical waveguide cores having the optical waveguide cladding material applied thereon.

One or more embodiments may comprise providing at end surfaces of the second array of optical waveguide cores light reflective surfaces (e.g. 26), the light reflective surfaces providing an angled optical coupling path between the second array of optical waveguide cores and the optical fibers in the array of optical fibers.

One or more embodiments may comprise: with the recessed portion at an edge of the surface of the semiconductor body, wherein the recessed portion may have an open side, providing the light reflective surfaces at end surfaces of the second array of optical waveguide cores facing towards the open side, and/or including beam collimating and/or focusing optics (e.g. the lenses 24 and/or the mirrors 26, such as parabolic/elliptical mirror surfaces in said angled optical coupling path between the second array of optical waveguide cores and the optical fibers in said array of optical fibers.

One or more embodiments may relate to a device (e.g. a silicon photonics chip 10 comprising formed thereon an optical interface 20), comprising: a semiconductor body (e.g. 10) having a surface (e.g. 10*a*) with a recessed portion (e.g. 14) therein, the recessed portion having a bottom surface (e.g. 14*a*) with a first array of optical waveguide cores (e.g. 102) extending side-by-side at (e.g. in proximity to or exposed at) the bottom surface, a second array of optical waveguide cores (e.g. 202; 202₁, 202₂) extending side-by-side over the first array of optical waveguide cores, the optical waveguide cores in the second array of optical waveguide cores in adiabatic coupling relationship with the optical waveguide cores in the first array of optical waveguide cores, and optical waveguide cladding material (e.g. 22) applied onto the second array of optical waveguide cores, wherein the second array of optical waveguide cores having the optical waveguide cladding material applied thereon may provide an optical fiber coupling interface (e.g. 20) to the optical waveguide cores in the first array of optical waveguide cores.

In one or more embodiments, the optical waveguide cores in the second array of optical waveguide cores may be larger in size than the optical waveguide cores in the first array of optical waveguide cores.

In one or more embodiments, the recessed portion may be arranged at an edge of the surface of the semiconductor body, where the recessed portion may have an open side.

In one or more embodiments, light reflective surfaces (e.g. 26) at end surfaces of the second array of optical waveguide cores may be present, the light reflective surfaces providing an angled optical coupling path to the second array of optical waveguide cores, with the device optionally comprising (refractory/reflective) beam collimating and/or focusing optics (e.g. the lenses 24 and/or the mirrors 26, such as parabolic/elliptical mirror surfaces) in said angled optical coupling path.

One or more embodiments may relate to a system that may comprise a device (e.g. comprising the silicon photonics chip 10 and the optical interface 20) and one of an array of optical fibers (e.g. the waveguide cores of a single mode fiber) and a photoelectric converter (e.g. 50) coupled to the second array of optical waveguide cores, at the optical fiber coupling interface, to the optical waveguide cores in the first array of optical waveguide cores.

Without prejudice to the underlying principles, the details and embodiments may vary, even significantly, with respect to what has been disclosed by way of example only, without departing from the extent of protection.

The extent of protection is defined by the annexed claims.

What is claimed is:

1. A method, comprising:
    providing a semiconductor body comprising a surface with a recessed portion therein, the recessed portion comprising a bottom surface, wherein optical waveguide cores in a first array of optical waveguide cores extend side-by-side at the bottom surface;
    providing a second array of optical waveguide cores over the first array of optical waveguide cores, wherein optical waveguide cores in the second array of optical waveguide cores extend side-by-side, wherein each optical waveguide core in the second array of optical waveguide cores is in an adiabatic coupling relationship with a corresponding optical waveguide core in the first array of optical waveguide cores; and
    applying an optical waveguide cladding material over the second array of optical waveguide cores, wherein the second array of optical waveguide cores and the optical waveguide cladding material applied thereon provides an optical fiber coupling interface.

2. The method of claim 1, wherein providing the second array of optical waveguide cores over the first array of optical waveguide cores comprises forming the optical fiber coupling interface through printing, hot embossing, direct writing, or lithography.

3. The method of claim 2, wherein providing the second array of optical waveguide cores over the first array of optical waveguide cores comprises forming the optical fiber coupling interface through direct writing, and wherein providing the second array of optical waveguide cores comprises:
    locally depositing a material within the recessed portion; and
    directly writing each optical waveguide core of the second array of optical waveguide cores into the material using a laser.

4. The method of claim 1, further comprising providing the recessed portion at an edge of the surface of the semiconductor body, wherein the recessed portion comprises an open side.

5. The method of claim 4, wherein:
    providing the semiconductor body further comprises providing a precursor semiconductor body including the semiconductor body arranged with the recessed portion bordering a complementary semiconductor body at a bordering plane, the bordering plane forming a closed-perimeter recessed portion in the precursor semiconductor body, wherein optical waveguide cores in the array of first optical waveguide cores extend side-by-side at a precursor bottom surface of the closed-perimeter recessed portion in the precursor semiconductor body, the precursor bottom surface comprising the bottom surface; and
    wherein the method further comprises severing the precursor semiconductor body at the bordering plane to separate the semiconductor body from the complementary semiconductor body.

6. The method of claim 5, wherein, before severing the precursor semiconductor body, the semiconductor body and the complementary semiconductor body are arranged in a face-to-face relationship, wherein the recessed portion and a complementary recessed portion are bordering in the face-to-face relationship at the bordering plane forming the closed-perimeter recessed portion in the precursor semiconductor body.

7. The method of claim 1, further comprising coupling a third array of optical fibers to the second array of optical waveguide cores, wherein the third array of optical fibers is optically coupled to the first array of optical waveguide cores.

8. The method of claim 7, further comprising:
    providing the recessed portion at an edge of the surface of the semiconductor body, wherein the recessed portion comprises an open side,
    wherein coupling the third array of optical fibers comprises butt coupling each optical fiber in the third array of optical fibers to a corresponding optical waveguide core of the second array of optical waveguide cores.

9. The method of claim 1, further comprising coupling a photoelectric converter to the second array of optical waveguide cores, wherein the photoelectric converter is optically coupled to optical waveguide cores of the first array of optical waveguide cores.

10. The method of claim 1, further comprising providing light reflective surfaces at end surfaces of the second array of optical waveguide cores, the light reflective surfaces providing an angled optical coupling path for the second array of optical waveguide cores.

11. The method of claim 10, wherein providing the light reflective surfaces comprises providing the light reflective surfaces at the end surfaces of the second array of optical waveguide cores facing towards an open side of the recessed portion at an edge of the surface of the semiconductor body.

12. The method of claim 10, further comprising including beam collimating or focusing optics in the angled optical coupling path for the second array of optical waveguide cores.

13. A device comprising:
    a semiconductor body comprising a surface and a recessed portion disposed in the surface, the recessed portion comprising a bottom surface;
    a first array of optical waveguide cores, wherein optical waveguide cores in the first array extend side-by-side at the bottom surface;
    a second array of optical waveguide cores, wherein optical waveguide cores in the second array extend side-by-side over the first array of optical waveguide cores, and wherein each optical waveguide core in the second array of optical waveguide cores is in an adiabatic coupling relationship with a corresponding waveguide core in the first array of optical waveguide cores; and
    optical waveguide cladding material disposed over the second array of optical waveguide cores, wherein the second array of optical waveguide cores and the optical waveguide cladding material applied thereon provides an optical fiber coupling interface.

14. The device of claim 13, wherein optical waveguide cores in the second array of optical waveguide cores are larger in size than optical waveguide cores in the first array of optical waveguide cores.

15. The device of claim 13, wherein the recessed portion is disposed at an edge of the surface of the semiconductor body, and wherein the recessed portion has an open side.

16. The device of claim 13, further comprising light reflective surfaces at end surfaces of the second array of optical waveguide cores, the light reflective surfaces providing an angled optical coupling path for the second array of optical waveguide cores.

17. The device of claim 16, further comprising beam collimating or focusing optics in the angled optical coupling path.

18. A system, comprising:
  a semiconductor body comprising a surface and a recessed portion disposed in the surface, the recessed portion comprising a bottom surface;
  a first array of optical waveguide cores, wherein optical waveguide cores in the first array extend side-by-side at the bottom surface;
  a second array of optical waveguide cores, wherein optical waveguide cores in the second array extend side-by-side over the first array of optical waveguide cores, wherein each optical waveguide core in the second array of optical waveguide cores is in an adiabatic coupling relationship with a corresponding waveguide core in the first array of optical waveguide cores;
  optical waveguide cladding material disposed over the second array of optical waveguide cores, wherein the second array of optical waveguide cores and the optical waveguide cladding material applied thereon provides an optical fiber coupling interface; and
  an external optical connection apparatus coupled to the second array of optical waveguide cores in the optical fiber coupling interface.

19. The system of claim 18, wherein the external optical connection apparatus comprises a third array of optical fibers coupled to the second array of optical waveguide cores, and wherein the third array of optical fibers is optically coupled to the first array of optical waveguide cores.

20. The system of claim 18, wherein the external optical connection apparatus comprises a photoelectric converter coupled to the second array of optical waveguide cores, and wherein the photoelectric converter is optically coupled to optical waveguide cores of the first array of optical waveguide cores.

* * * * *